US010198817B2

(12) United States Patent
Small et al.

(10) Patent No.: US 10,198,817 B2
(45) Date of Patent: Feb. 5, 2019

(54) TECHNOLOGIES FOR DIAGNOSING NEUROLOGICAL OR PSYCHIATRIC ILLNESSES

(71) Applicant: THE TRUSTEES OF COLUMBIA UNIVERSITY IN THE CITY OF NEW YORK, New York, NY (US)

(72) Inventors: Scott A. Small, Millerton, NY (US); Frank A. Provenzano, New York, NY (US); Usman A. Khan, Brooklyn, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 0 days.

(21) Appl. No.: 15/304,611

(22) PCT Filed: Apr. 17, 2015

(86) PCT No.: PCT/US2015/026523
§ 371 (c)(1),
(2) Date: Oct. 17, 2016

(87) PCT Pub. No.: WO2015/161286
PCT Pub. Date: Oct. 22, 2015

(65) Prior Publication Data
US 2017/0039714 A1 Feb. 9, 2017

Related U.S. Application Data

(60) Provisional application No. 61/981,005, filed on Apr. 17, 2014.

(51) Int. Cl.
G06K 9/00 (2006.01)
G06T 7/00 (2017.01)
(Continued)

(52) U.S. Cl.
CPC .............. G06T 7/0016 (2013.01); G06T 5/50 (2013.01); G06T 7/11 (2017.01); G06T 7/136 (2017.01);
(Continued)

(58) Field of Classification Search
None
See application file for complete search history.

(56) References Cited

U.S. PATENT DOCUMENTS

2004/0002646 A1 1/2004 Oesingmann
2006/0182349 A1 8/2006 Valadez
(Continued)

FOREIGN PATENT DOCUMENTS

| CN | 1689510 | 4/2004 |
|---|---|---|
| WO | WO2008020864 | 11/2006 |
| WO | WO2010055405 | 11/2009 |

OTHER PUBLICATIONS

Regional vulnerability in Huntington's disease: FMRI guided molecular analysis in patients and a mouse model of disease, by Lewandowski et al., Neurobiology of Disease 52 (2013) 84-93.*

(Continued)

Primary Examiner — Vikkram Bali
(74) Attorney, Agent, or Firm — Dentons US LLP

(57) ABSTRACT

A technology which enables identifying, via a computer, a vessel in a third image. The third image is obtained from a subtraction of a second image from a first image. The second image and the first image are aligned on an imaging space. The first image is post-contrast. The second image is pre-contrast. The technology enables determining, via the computer, a voxel intensity mean value of a segment of the vessel in the third image. The technology enables obtaining, via the computer, a fourth image from a division of the third image by the voxel intensity mean value. The technology (Continued)

enables applying, via the computer, a filter onto the fourth image. The technology enables generating, via the computer, a filter mask based on the fourth image.

30 Claims, 16 Drawing Sheets

(51) Int. Cl.
    *G06T 5/50*    (2006.01)
    *G06T 7/11*    (2017.01)
    *G06T 7/136*   (2017.01)
    G06T 5/20      (2006.01)
(52) U.S. Cl.
    CPC ...... *G06T 5/20* (2013.01); *G06T 2207/10088* (2013.01); *G06T 2207/20224* (2013.01); *G06T 2207/30016* (2013.01); *G06T 2207/30101* (2013.01)

(56) References Cited

U.S. PATENT DOCUMENTS

| | | |
|---|---|---|
| 2008/0221441 A1 | 9/2008 | Bjornerud et al. |
| 2008/0285830 A1 | 11/2008 | Hong et al. |
| 2013/0216119 A1 | 8/2013 | Baumgart |

OTHER PUBLICATIONS

Bjornerud et al., A fully automated method for quantitative cerebral hemodynamic analysis using DSC-MRI, Journal of Cerebral Blood Flow & Metabolism, 2010, vol. 30, No. 5, pp. 1066-1078.
Brickman et al., Enhancing dentate gyrus function with dietary flavanols improves cognition in older adults, Nature Neuroscience, 2014, 9 pages.
Gaisler-Salomon et al., How high-resolution basal-state functional imaging can guide the development of new pharmacotherapies for schizophrenia, Schizophr Bull, 2009 vol. 35, No. 6, pp. 1037-1044.
Goode, Little-Known Health Act Fact: Prison Inmates are Signing Up, New York Times, Mar. 2014, 4 pages.
International Search Report and Written Opinion dated Jul. 10, 2015 in related PCT Application No. PCT/US15/26523 filed Apr. 17, 2015 (8 pages).
Khan et al., Molecular drivers and cortical spread of lateral entorhinal cortex dysfunction in preclinical Alzheimer's disease, Nature Neuroscience, 2014, vol. 17, No. 2, pp. 304-311 and addendum (2 pages).
Kose et al., Cerebral Blood Volume in Hippocampal Sector CA1 is Increased in Schizophrenia Conclusions Background, Conference Paper, Jun. 2011, 1 page.
Lewandowski et al., Regional vulnerability in Huntington's disease: fMRI-guided molecular analysis in patients and a mouse model of disease, Neurobiol Dis, 2013, vol. 52, pp. 84-93.
Pereira et al., An in vivo correlate of exercise-induced neurogenesis in the adult dentate gyrus, Proc Natl. Acad. Sci, 2007, vol. 104, No. 13 pp. 5638-5643.
Schobel et al., Imaging patients with psychosis and a mouse model establishes a spreading pattern of hippocampal dysfunction and implicates glutamate as a driver, Neuron, 2013, vol. 78, No. 1, pp. 81-93 and addendum (9 pages).
Schobel et al., Differential targeting of the CA1 subfield of the hippocampal formation by schizophrenia and related psychotic disorders, Arch Gen Psychiatry, 2009, vol. 66, No. 9, pp. 938-946.
Small et al., A pathophysiological framework of hippocampal dysfunction in ageing and disease, Nat. Rev. Neuroscience, 2011, vol. 12, No. 10, pp. 585-601.
Zierhut at al., Hippocampal CA1 deformity is related to symptom severity and antipsychotic dosage in schizophrenia, Brain, A Journal of Neurology, 2013, vol. 136, No. 3, pp. 804-814.

* cited by examiner

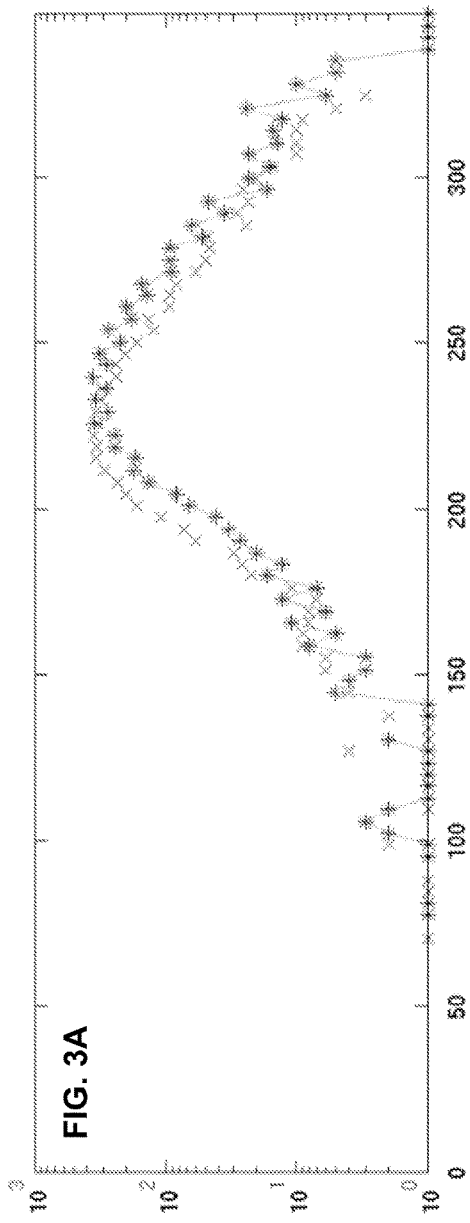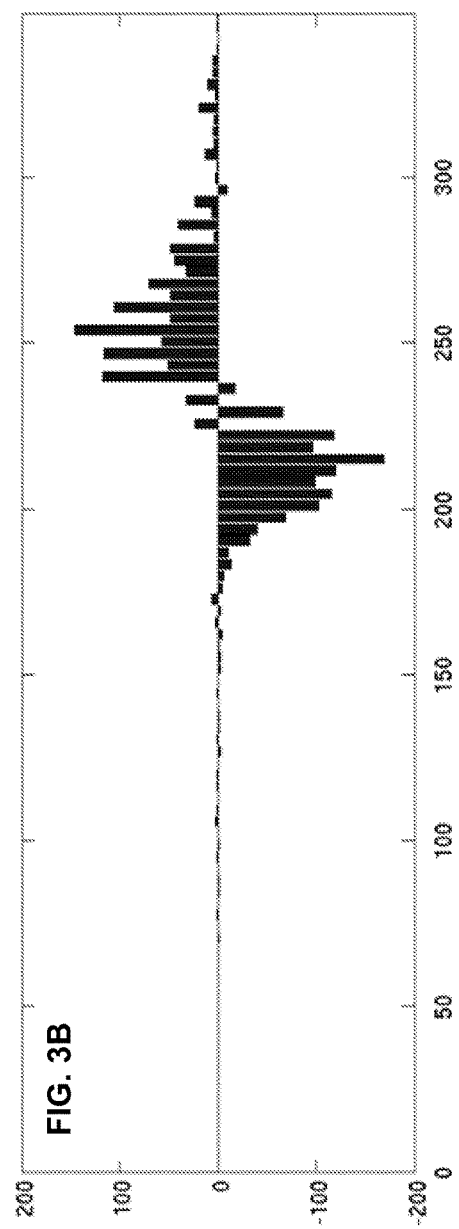
FIG. 3A
FIG. 3B

FIG. 4A
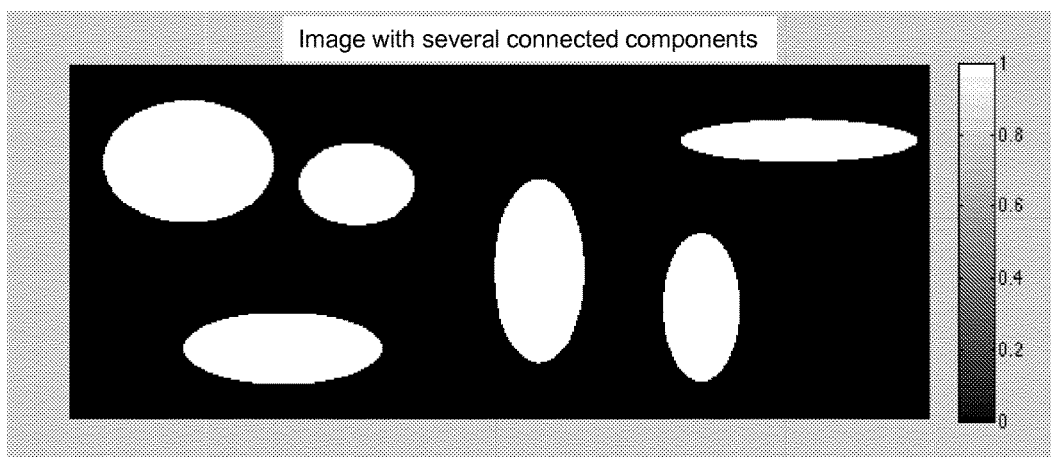
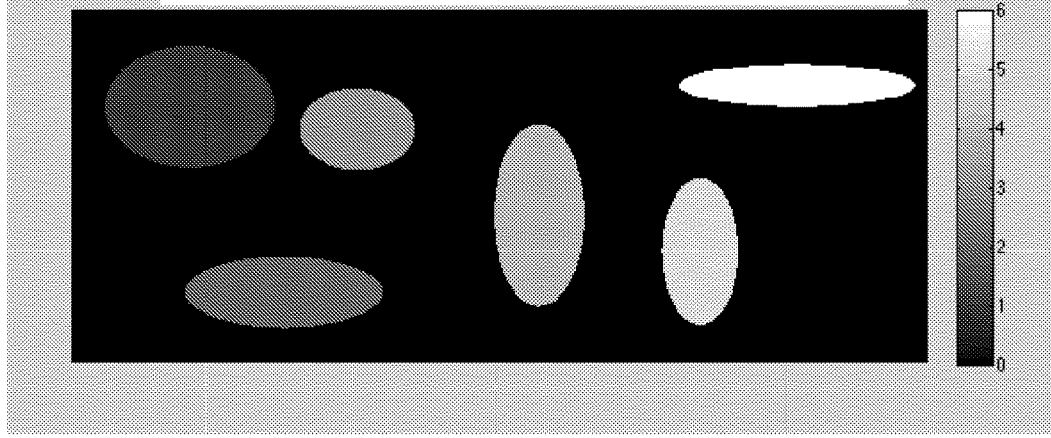
FIG. 4B

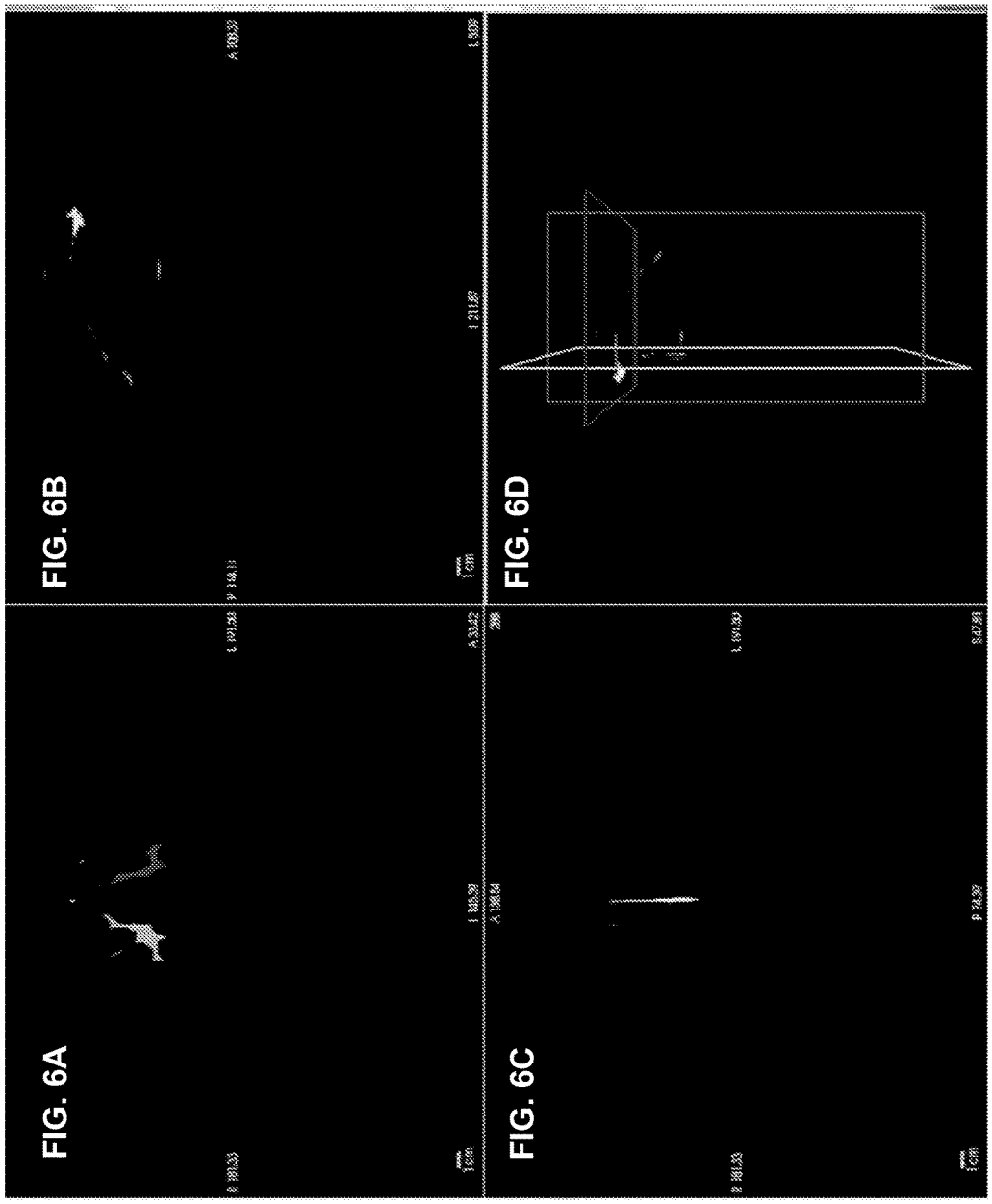

```
ccarray =

[ 1]      [ 1.3057]
    [ 2]      [19.4500]
    [ 3]      [ 1.8049]
    [ 4]      [     NaN]
    [ 5]      [       1]
    [ 6]      [     NaN]
    [ 7]      [       1]
    [ 8]      [30.7500]
    [ 9]      [     NaN]
    [10]      [27.5000]
```

FIG. 7

TECHNOLOGIES FOR DIAGNOSING NEUROLOGICAL OR PSYCHIATRIC ILLNESSES

CROSS-REFERENCE TO RELATED APPLICATIONS

The present application claims the benefit of priority to PCT International Application No. PTC/US2015/026523 filed 17 Apr. 2015, which claims the benefit of U.S. Provisional Application Ser. No. 61/981,005 filed 17 Apr. 2014, each of which is incorporated herein by reference in its entirety for all purposes.

STATEMENT REGARDING FEDERALLY SPONSORED RESEARCH OR DEVELOPMENT

This invention was made with government support under grand MH093398 awarded by the National Institutes of Health. The government has certain rights in the invention.

BACKGROUND

In the present disclosure, where a document, an act and/or an item of knowledge is referred to and/or discussed, then such reference and/or discussion is not an admission that the document, the act and/or the item of knowledge and/or any combination thereof was at the priority date, publicly available, known to the public, part of common general knowledge and/or otherwise constitutes prior art under the applicable statutory provisions; and/or is known to be relevant to an attempt to solve any problem with which the present disclosure is concerned with. Further, nothing is disclaimed.

Magnetic resonance imaging (MRI) is a technology which has many uses. One of such uses is human brain imaging for research purposes or medical purposes. Functional MRI (FMRI) is a type of MRI which measures brain activity based on detecting changes in blood oxygen content or blood flow, where the changes result from neural activity of the brain.

Schizophrenia is a psychiatric disorder which afflicts from about 0.5% to about 1% of US adults. Consequently, earlier confirmed schizophrenia diagnosis can lead to fewer symptoms, greater chance for treatment response, or lower medical costs, especially cumulatively. However, confirmation of such diagnosis through traditional subjective methods, including responsiveness to antipsychotic medication and follow-up evaluation, can be costly and time-consuming, such as for several months. Furthermore, there is no established objective method that has been shown to delineate schizophrenia and other similar diseases. Additionally, there is no established objective method to determine which schizophrenia patients will convert to an advanced stage of psychosis when first evaluated by a healthcare provider, such as a psychiatrist. As a result, the healthcare provider does not know which of the schizophrenia patients will convert to a more advanced state of psychosis, or how well a targeted treatment is working. As shown in FIG. 1, a cycle of care for a schizophrenia patient with suspected psychosis entails a battery of tests, evaluations, and follow-ups, as well as long term care. Accordingly, there is no established objective method to provide a first-line evaluation to determine which schizophrenia patients are at greater risk of converting to a more advanced state of psychosis or schizophrenia.

Alzheimer's disease has been linked to entorhinal cortex dysfunction. To research or diagnose how Alzheimer's disease affects the entorhinal cortex, a high resolution, metabolism sensitive, and reliable imaging variant is desired. Cerebral blood volume (CBV) is one such variant. However, CBV often relies on manual labeling of relevant regions of interest (ROI), which cannot distinguish various entorhinal cortex areas without reliable anatomical landmarks.

BRIEF SUMMARY

The present disclosure at least partially addresses a limitation of existing systems and methods. However, the present disclosure can prove useful to other technical areas. Therefore, the claims should not be construed as necessarily limited to addressing any of the above.

One embodiment comprises a method comprising identifying, via a computer, a vessel in a third image, wherein the third image is obtained from a subtraction of a second image from a first image, wherein the second image and the first image are aligned within an imaging space, wherein the first image is post-contrast, wherein the second image is pre-contrast; determining, via the computer, a voxel intensity mean value of a segment of the vessel in the third image; obtaining, via the computer, a fourth image from a division of the third image by the voxel intensity mean value; applying, via the computer, a filter onto the fourth image; generating, via the computer, a filter mask based on the fourth image.

In the one embodiment, the method may further comprise performing, via the computer, a vessel segmentation process on at least one of the first image or the second image before the identifying.

In the one embodiment, the method may further comprise wherein the performing is automatically triggered.

In the one embodiment, the method may further comprise wherein the vessel comprises a diameter of about one centimeter or less.

In the one embodiment, the method may further comprise wherein the identifying is based on a vesselness filter and a pre-defined region of interest, wherein the vesselness filter filters based on a set of eigen values of a Hessian matrix of the third image, wherein the third image is modified such that the region of interest is positioned in a predefined area.

In the one embodiment, the method may further comprise wherein the voxel intensity mean value is based on a highest voxel intensity range in the segment, wherein the range comprises the top 40% of voxel intensities.

In the one embodiment, the method may further comprise wherein the range comprises the top 33% of voxel intensities.

In the one embodiment, the method may further comprise wherein the range comprises the top 25% of voxel intensities.

In the one embodiment, the method may further comprise wherein the third image is a cerebral blood volume map, wherein the filter is based on at least one of a performance of an expectation-maximization segmentation, or a fitting of a bimodal Gaussian curve to a histogram of data in accordance with the third image.

In the one embodiment, the method may further comprise wherein the filter mask is a binary mask, and further comprising: applying, via the computer, the binary mask to the third image; mapping, via the computer, based on the applying, the third image according to a change in a transverse relaxation time induced via an input of a contrasting agent.

Another embodiment comprises a system comprising a hardware processor and a memory coupled to the hardware processor. The memory stores a set of instructions to execute via the hardware processor. The instructions instruct the hardware processor to perform a method comprising identifying, via a computer, a vessel in a third image, wherein the third image is obtained from a subtraction of a second image from a first image, wherein the second image and the first image are aligned within an imaging space, wherein the first image is post-contrast, wherein the second image is pre-contrast; determining, via the computer, a voxel intensity mean value of a segment of the vessel in the third image; obtaining, via the computer, a fourth image from a division of the third image by the voxel intensity mean value; applying, via the computer, a filter onto the fourth image; generating, via the computer, a filter mask based on the fourth image.

In the another embodiment, the method may further comprise performing, via the computer, a vessel segmentation process on at least one of the first image or the second image before the identifying.

In the another embodiment, the method may further comprise wherein the performing is automatically triggered.

In the another embodiment, the method may further comprise wherein the vessel comprises a diameter of about one centimeter or less.

In the another embodiment, the method may further comprise wherein the identifying is based on a vesselness filter and a pre-defined region of interest, wherein the vesselness filter filters based on a set of eigen values of a Hessian matrix of the third image, wherein the third image is modified such that the region of interest is positioned in a predefined area.

In the another embodiment, the method may further comprise wherein the voxel intensity mean value is based on a highest voxel intensity range in the segment, wherein the range comprises the top 40% of voxel intensities.

In the another embodiment, the method may further comprise wherein the range comprises the top 33% of voxel intensities.

In the another embodiment, the method may further comprise wherein the range comprises the top 25% of voxel intensities.

In the another embodiment, the method may further comprise wherein the third image is a cerebral blood volume map, wherein the filter is based on at least one of a performance of an expectation-maximization segmentation, or a fitting of a bimodal Gaussian curve to a histogram of data in accordance with the third image.

In the another embodiment, the method may further comprise wherein the filter mask is a binary mask, and further comprising: applying, via the computer, the binary mask to the third image; mapping, via the computer, based on the applying, the third image according to a change in a transverse relaxation time induced via an input of a contrasting agent.

Yet another embodiment comprises a computer-readable storage device storing a set of instructions for execution via a processing circuit to implement a method, wherein the method comprising: identifying, via a computer, a vessel in a third image, wherein the third image is obtained from a subtraction of a second image from a first image, wherein the second image and the first image are aligned within an imaging space, wherein the first image is post-contrast, wherein the second image is pre-contrast; determining, via the computer, a voxel intensity mean value of a segment of the vessel in the third image; obtaining, via the computer, a fourth image from a division of the third image by the voxel intensity mean value; applying, via the computer, a filter onto the fourth image; generating, via the computer, a filter mask based on the fourth image.

In the yet another embodiment, the method may further comprise performing, via the computer, a vessel segmentation process on at least one of the first image or the second image before the identifying.

In the yet another embodiment, the method may further comprise wherein the performing is automatically triggered.

In the yet another embodiment, the method may further comprise wherein the vessel comprises a diameter of about one centimeter or less.

In the yet another embodiment, the method may further comprise wherein the identifying is based on a vesselness filter and a pre-defined region of interest, wherein the vesselness filter filters based on a set of eigen values of a Hessian matrix of the third image, wherein the third image is modified such that the region of interest is positioned in a predefined area.

In the yet another embodiment, the method may further comprise wherein the voxel intensity mean value is based on a highest voxel intensity range in the segment, wherein the range comprises the top 40% of voxel intensities.

In the yet another embodiment, the method may further comprise wherein the range comprises the top 33% of voxel intensities.

In the yet another embodiment, the method may further comprise wherein the range comprises the top 25% of voxel intensities.

In the yet another embodiment, the method may further comprise wherein the third image is a cerebral blood volume map, wherein the filter is based on at least one of a performance of an expectation-maximization segmentation, or a fitting of a bimodal Gaussian curve to a histogram of data in accordance with the third image.

In the yet another embodiment, the method may further comprise wherein the filter mask is a binary mask, and further comprising: applying, via the computer, the binary mask to the third image; mapping, via the computer, based on the applying, the third image according to a change in a transverse relaxation time induced via an input of a contrasting agent.

BRIEF DESCRIPTION OF THE DRAWINGS

The accompanying drawings illustrate example embodiments of the present disclosure. Such drawings are not to be construed as necessarily limiting the disclosure. Like numbers and/or similar numbering scheme can refer to like and/or similar elements throughout.

FIG. 3A shows an example X-Y diagram indicative of a signal increase in a post contrast image according to the present disclosure.

FIG. 3B shows an example histogram of the X-Y diagram of FIG. 3A, according to the present disclosure.

FIG. 4A shows an example embodiment of an image with several connected components which are unlabeled according to the present disclosure.

FIG. 4B shows an example embodiment of an image with several connected components which are labeled based on color or shading of contiguous voxels according to the present disclosure.

FIG. 6A shows an example embodiment of a frontal view of a connected component mask according to the present disclosure.

FIG. 6B shows an example embodiment of a sagittal side view of a connected component mask according to the present disclosure.

FIG. 6C shows an example embodiment of a top view of a connected component mask according to the present disclosure.

FIG. 6D shows an example embodiment of an orthographic projection view of a connected component mask according to the present disclosure.

FIG. 7 shows an example embodiment of a ranking of likelihood of an isolated mask compared to a probabilistic atlas according to the present disclosure.

DETAILED DESCRIPTION OF THE PREFERRED EMBODIMENTS

Figure 1:
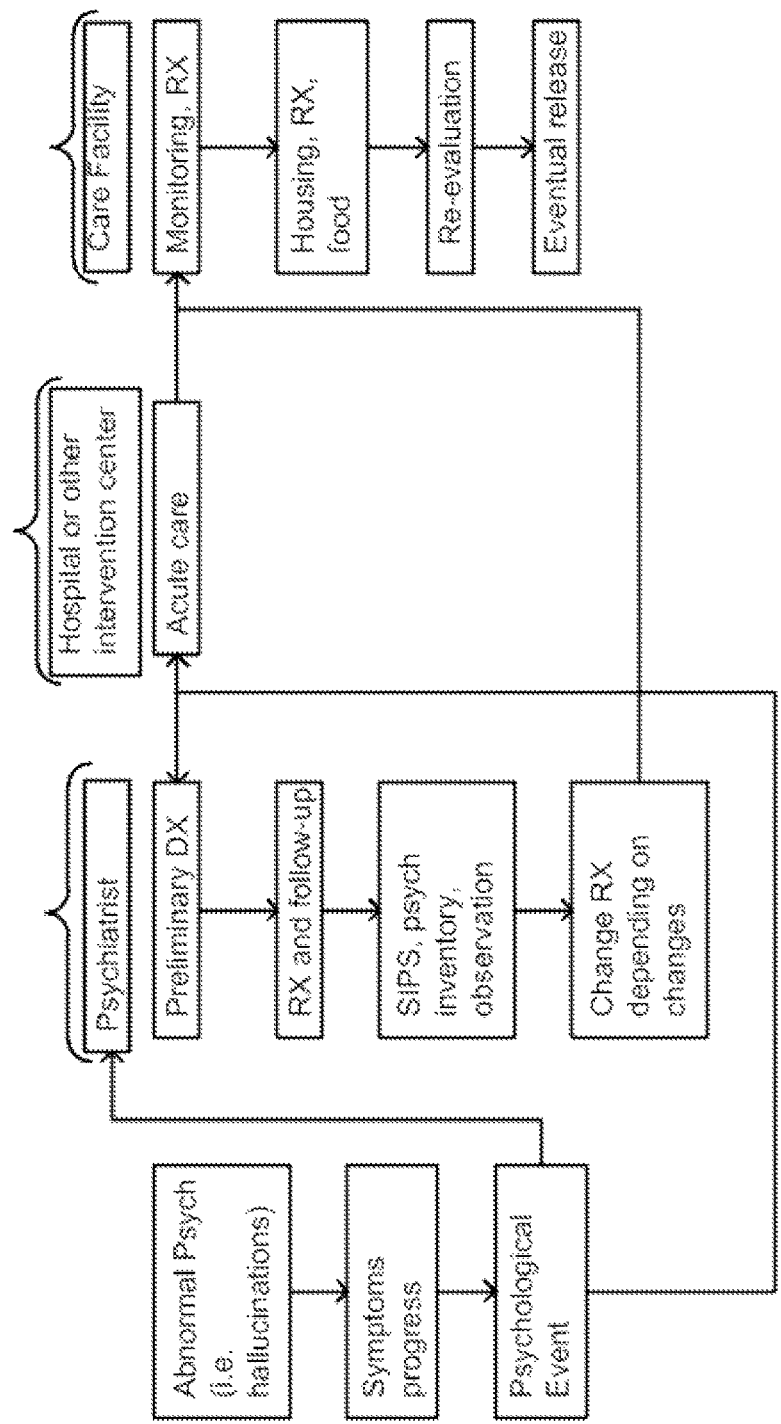
FIG. 1 shows a flowchart of a cycle of care for a schizophrenia patient according to the present disclosure.

The present disclosure is now described more fully with reference to the accompanying drawings, in which example embodiments of the present disclosure are shown. The present disclosure can, however, be embodied in many different forms and should not be construed as necessarily being limited to the example embodiments disclosed herein. Rather, these example embodiments are provided so that the present disclosure is thorough and complete, and fully conveys the concepts of the present disclosure to those skilled in the relevant art. In addition, features described with respect to certain example embodiments can be combined in and/or with various other example embodiments. Different aspects and/or elements of example embodiments, as disclosed herein, can be combined in a similar manner.

The terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

The terminology used herein is for describing particular example embodiments and is not intended to be necessarily limiting of the present disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

As used herein, the term "about" and/or "substantially" refers to a +/−10% variation from the nominal value/term. Such variation is always included in any given value/term provided herein, whether or not such variation is specifically referred thereto.

If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

In one aspect, a system provides a first-line evaluation of which patients are at greater risk of converting to a more advanced state of psychosis or schizophrenia. For example, such system can comprise methods and systems which employ software that can automatically generate a variant of FMRI derived from routine brain MRI sequences i.e. CBV, which is a correlate of brain activity because such values are altered in schizophrenia. More specifically, glutamate dyshomeostasis, specifically in the CA1 sub-region of a patient's hippocampus, seems to be able to correlate to conversion of at-risk patients to more advanced psychosis. Thus, changes in glutamate, a neurotransmitter, have been shown to correlate to schizophrenia and psychosis diagnosis. These CBV values provide objective data that can inform healthcare providers, such as psychiatrists, or caregivers, that should lead to a quicker or more accurate diagnosis. For another example, an image processing method can identify glutamate dyshomeostasis values in an efficient and reliable manner. Thus, in many cases, a healthcare provider, such as a physician, may be able to order a brain MRI as a matter of practice in these susceptible groups to rule out a presence of brain lesions. For yet another example, a healthcare provider, such as a physician, could order a CBV scan with relatively minimal, if any, extra effort for a patient or MRI site, and a result of such scan with CBV values can be generated in a few hours. Accordingly, if a patient were to receive a CBV scan, then a set of statistics could be generated for cranial regions corresponding to a severity of such disease. For many people who have at least one psychotic episode per year, this information would give healthcare providers, such as psychiatrists, or treatment facilities more information and potentially reduce the amount of time needed for a healthcare provider, such as a psychiatrist, to confirm a schizophrenia diagnosis.

Figure 2:
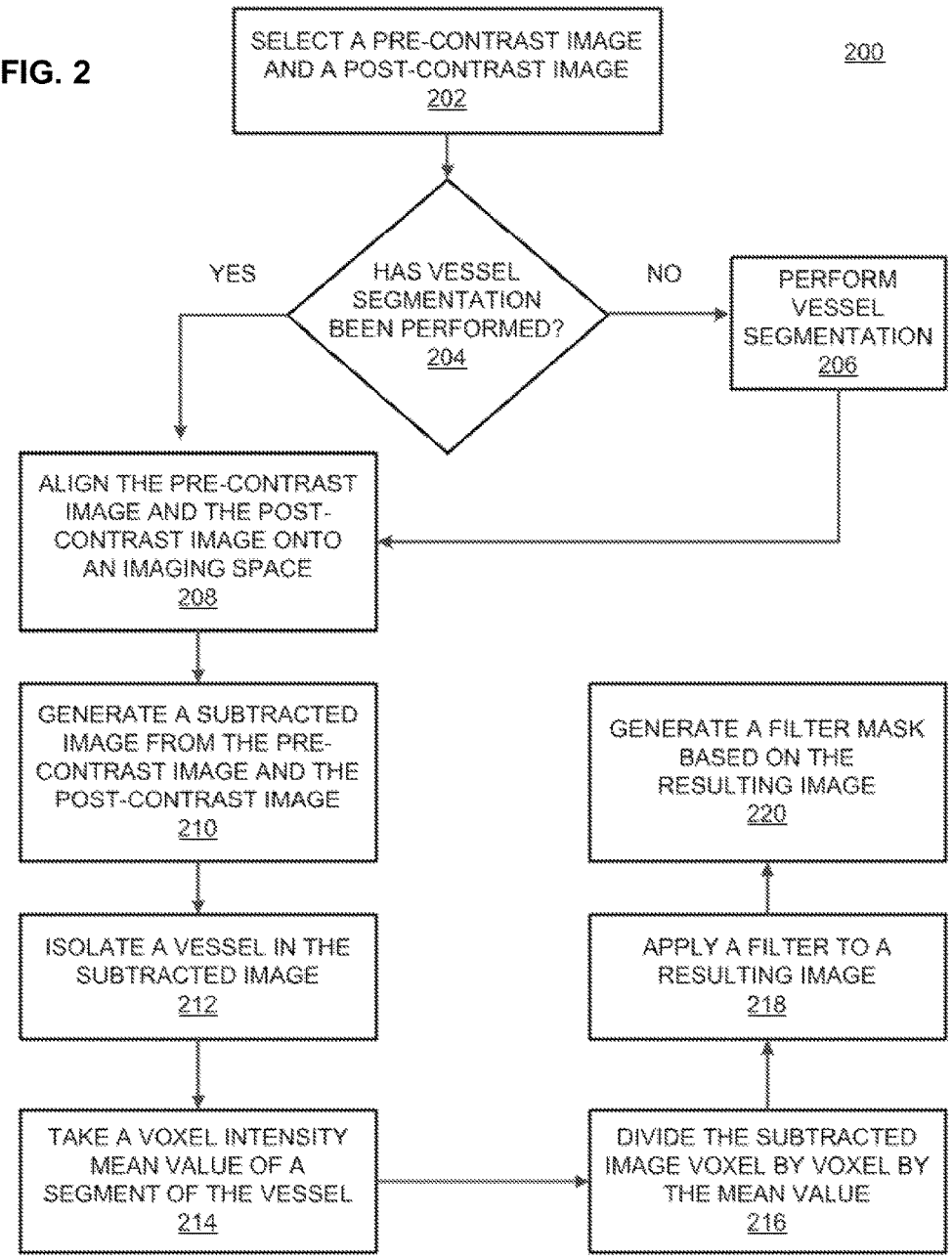
FIG. 2 shows a flowchart of an example embodiment of a process for image processing according to the present disclosure.
Figure 5A:
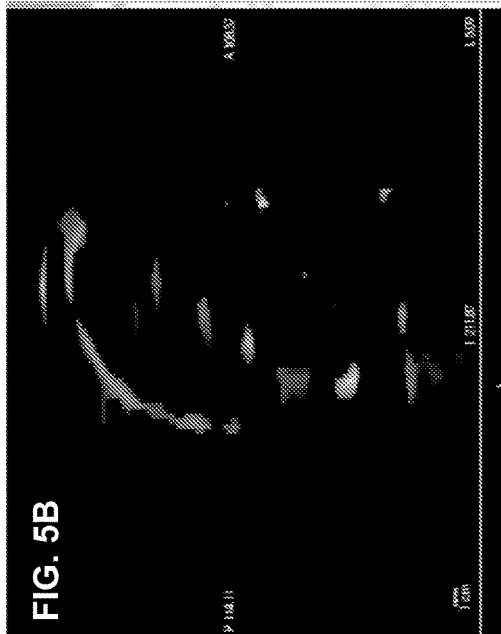
FIG. 5A shows an example embodiment of a frontal view of a raw unbinarized vesselness mask according to the present disclosure.
Figure 5B:
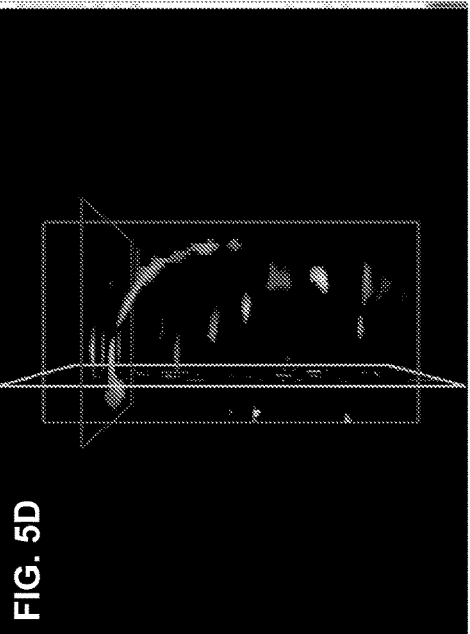
FIG. 5B shows an example embodiment of a sagittal side view of a raw unbinarized vesselness mask according to the present disclosure.
Figure 5C:
FIG. 5C shows an example embodiment of a top view of a raw unbinarized vesselness mask according to the present disclosure.
Figure 5D:
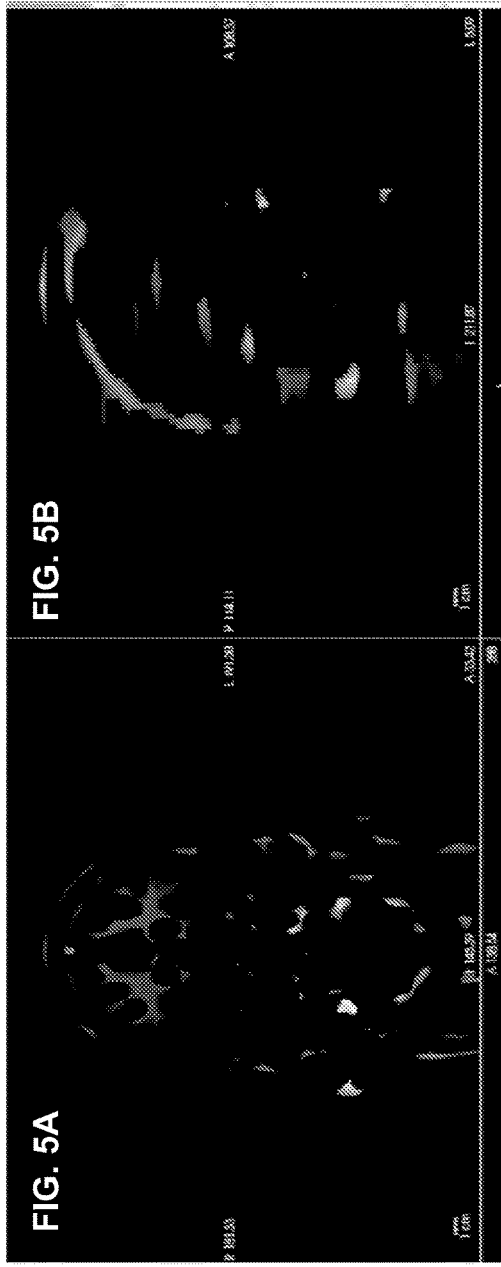
FIG. 5D shows an example embodiment of an orthographic projection view of a raw unbinarized vesselness mask according to the present disclosure.

FIG. 2 shows a flowchart of an example embodiment of a process for image processing according to the present disclosure. A process 200 is used for image processing, as described herein. The process 200 is performed via at least one actor, such as via a user operating a computer of FIG. 17A. For example, the user can be a healthcare provider, such as a physician, a psychiatrist, a nurse, or a technician. Alternatively, the process 200 is fully automated. The process 200 includes a plurality of blocks 202-220, which are performed consecutively.

In block 202, a selection of a pre-contrast image and a post-contrast image is made via a computer. The selection can be automatic, such as based on a heuristic or artificial intelligence (AI). The selection can be manual, such as via a user input. For example, such selection is made via a graphical user interface (GUI) running on the computer.

The pre-contrast image depicts, in multiple dimensions, such as three dimensions (3D), an area of a brain, such as a hippocampus, before an intake of a contrast agent, such as a gadolinium solution. Note that such depiction can be grayscale, monochrome, or in color. Additionally, any type of contrasting agent used for brain imaging may be used. These can include a super paramagnetic iron oxide. The post-contrast image depicts, in multiple dimensions, such as 3D, the area of the brain, such as the hippocampus, after the intake of the contrast agent, such as the gadolinium solution. Note that such depiction can be grayscale, monochrome, or in color.

The pre-contrast image and the post-contrast image are based on human subjects. For example, such subjects can be identified from a community-based FMRI study of individuals 65 years and older, who received a detailed neuropsychological and neurological evaluation, and who were free of Alzheimer's disease dementia, mild Alzheimer's disease, or mild cognitive impairment indicative of a pre-dementia stage of Alzheimer's disease in this population. For example, the pre-contrast image can be a FMRI image acquired with a 1.5-T Philips Intera scanner, generating T1-weighted images (lime to repeat, 20 milliseconds (ms): time to echo, 6 ms; flip angle, 25 degrees; in plane resolution, 0.78 millimeters (mm)×0.78 mm; slice thickness, 3 mm) acquired perpendicular to a long axis of a hippocampus. The post-contrast image can be a FMRI image similarly acquired four minutes after an intravenous administration of the contrast agent gadolinium (0.1 millimoles per liter (mmol) kilogram $(kg)^{-1}$).

The pre-contrast image and the post-contrast image are stored in a data store, such as a data structure, for instance, a database, which can be relational. The data store can be local to or remote from the computer, such as via a distributed computing platform. For example, the data store can be coupled, whether wired or wireless, to the computer such that the computer is able to retrieve the pre-contrast image and the post-contrast image therefrom. Upon selection, the pre-contrast image and the post-contrast image are retrieved from the data store for processing, as described herein. Note that the data store stores the pre-contrast image and the post-contrast image, whether alone or with other images of any type, size, date, or number. Alternatively, the pre-contrast image and the post-contrast image can be stored alone in one data store or distributed among a set of data stores, whether such data stores are local or remote from each other. Alternatively, a set of pointers or references can be stored in the data store, where the set of pointers or references points to or refers to the pre-contrast image and the post-contrast image.

Upon such selection, the pre-contrast image and the post-contrast image are ready for processing, such as via being loaded into a random access memory (RAM) of the computer or a processor cache. Alternatively, the pre-contrast image and the post-contrast image are copied, whether serially or in parallel, and such copies are then ready for processing, which can be useful in order to maintain a trail or a log, thereby avoiding a modification of at least one of the pre-contrast image and the post-contrast image, which can be original.

In block 204, a determination is made via the computer whether a vessel segmentation has been performed on the pre-contrast image and the post-contrast image. For example, the determination determines whether the pre-contrast image and the post-contrast image depict a brain vasculature in a sufficiently distinct manner for further image processing. Such determination can be made automatically, such as via the pre-contrast image and the post-contrast being flagged indicative of already performed vessel segmentation and the computer reading such flags, or via the computer performing machine vision algorithms or pattern recognition algorithms on the pre-contrast image and the post-contrast image to determine whether the vessel segmentation has already been performed. Note that automatic determination can be made local to or remote from the computer, such as via a distributed computing platform. Such determination can also be made manually, such as via a user input into the computer based on personal observation of the pre-contrast image and the post-contrast image. If the determination that the vessel segmentation has been performed, then block 208 is performed. If the determination that the vessel segmentation has not been performed, then block 206 is performed.

In block 206, a vessel segmentation algorithm is performed on the pre-contrast image and the post-contrast image via the computer. Such performance can be local to the computer or remote from the computer, such as via a distributed computing platform. The vessel segmentation algorithm can be automatically triggered, such as via the computer reading a flag indicative of a lack of a vessel segmentation in at least one of the pre-contrast image or the post-contrast image, or the computer machine vision algorithm or the pattern recognition algorithm automatically triggering the vessel segmentation algorithm based on processing. The vessel segmentation algorithm can be manually triggered, such as via a user interfacing with a GUI running on the computer, such as via activating a visual element on the GUI, such as a button. The vessel segmentation can be performed via at least one of a pattern recognition technique, a model-based technique, an AI-based technique, a neural network-based technique, or a tubular objection detection technique.

In block 208, the pre-contrast image and the post-contrast image are aligned onto an imaging space. Such alignment can be automated, such as via the computer identifying, such as via a machine vision algorithm or a pattern recognition algorithm, a set of segmented vessels on the pre-contrast image and the post-contrast image. Note that automatic alignment can be made local to or remote from the computer, such as via a distributed computing platform. Such alignment can also be manual, such as based on a user request input into the computer, such as via an input device. The imaging space can be a fluid attenuated inversion recovery (FLAIR) imaging space, but other types of imaging spaces are possible. Note that the pre-contrast image and the post-contrast image are registered on the imaging space. For example, the image registration is non-linear, but other types of image registration are possible, such as a label based approach, an intensity based approach, or a hybrid/combination thereof. For example, the image registration is performed via a non-linear warp/spatial transformation and a transformation matrix, both of which can be saved for subsequent use. Note that, in some embodiments, at least one of an intensity normalization, an image reorientation, and a brain extraction can occur before, during, or after performance of block 208.

In block 210, a subtracted image is generated from the pre-contrast image and the post-contrast image via the computer. Such subtraction can be automated, such as via the computer identifying, such as via a machine vision algorithm or a pattern recognition algorithm, a set of segmented vessels on the pre-contrast image and the post-contrast image. Note that the automatic subtraction can be made local to or remote from the computer, such as via a distributed computing platform. Such subtraction can also be manual, such as based on a user request input into the computer, such as via an input device. For example, the pre-contrast image is subtracted from the post-contrast image to generate a raw subtracted volume, i.e. a third image. Intra-subject and intra-modal co-registrations used a symmetric rigid body alignment incorporating a robust statistics measure. Raw image values of the subtracted image can be normalized to a mean signal intensity of a patient's superior sagittal sinus. This mean value represents pure blood value of the subtracted image and by normalizing to this value, the present disclosure enables a computer to generate an image that represents percent value of blood volume, where the value of the mean signal in the vessel indicates 100%.

In block 212, a vessel is isolated in the subtracted image via the computer. The vessel can be a blood vessel, such as an artery, an arteriole, a vein, a venule, or a capillary. Alternatively, the vessel can be a lymph vessel. Such isolation can be automated, such as via the computer receiving an indication of a presence of the subtracted image, such as a message. For example, the isolation can comprise identifying the vessel in the subtracted image based on a set of criteria. Note that the automatic isolation can be made local to or remote from the computer, such as via a distributed computing platform. Such isolation can also be manual, such as based on a user request input into the computer, such as via an input device. For example, the superior sagittal sinus can be isolated in the subtracted image using a modified Frangi vesselness filter and a pre-defined ROI, where the Frangi filter uses 3D eigenvalues of a Hessian matrix of the subtracted image to calculate a set of global shape parameters of the superior sagittal sinus ROI, including, but not limited to, its anisotropic features. The isolated image can then be eroded using a standard kernel to ensure that the ROI sits entirely in a sinus cavity.

In block 214, a voxel intensity mean value of a segment of the vessel is obtained via the computer. Note that the segment comprises at least a portion of the vessel. The intensity is indicative of blood content or blood flow in the segment of the vessel. The mean value is obtained on a voxel-by-voxel basis for the segment based on a highest voxel intensity in the segment of the vessel, such as, for example, top twenty five (25) percent of the segment, i.e. top 25% of the most illuminated voxels in the segment of the vessel. Note that such amount is an example and other amounts can be used, whether greater, such as thirty three

(33) percent, or lesser, such as fifteen (15) percent. For example, a cut-off of less than top 10%, top 10%, top 11%, top 12%, top 13%, top 14%, top 15%, top 16%, top 17%, top 18%, top 19%, top 20%, top 21%, top 22%, top 23%, top 24%, top 25%, top 26%, top 27%, top 28%, top 29%, top 30%, top 31%, top 32%, top 33%, top 34%, top 35%, top 36%, top 37%, top 38%, top 39%, top 40%, greater than top 40%, or any ranges of the foregoing can be used. For example, a mask can be applied to the subtracted image, and a measure of absolute blood is calculated as a mean of the subtracted image. Such obtaining can be automated, such as via the computer receiving an indication of a presence of the vessel in the subtracted image, such as a message. Note that the automatic obtaining can be made local to or remote from the computer, such as via a distributed computing platform. Such obtaining can also be manual, such as based on a user request input into the computer, such as via an input device.

In block 216, the subtracted image is divided by the voxel intensity mean value via the computer. Such division is matrix based and determines a percentage of CBV in the subtracted image. Accordingly, a CBV map image is formed, which indicates a percentage of blood volume in the segment. Such division can be automated, such as via the computer receiving an indication of a receipt of the voxel intensity mean value, such as via a message. Note that the automatic division can be made local to or remote from the computer, such as via a distributed computing platform. Such division can also be manual, such as based on a user request input into the computer, such as via an input device.

In block 218, a filter is applied to a resulting image, i.e., the CBV map, via the computer. Such filtering filters out large vasculature, such as entorhinal cortex vasculature, and filters in smaller vasculature, which is desired. For example, to rule out various effects resulting from large vessels, several methods of vessel filtering can be used, such as fitting a bimodal Gaussian curve to a histogram of data or performing an expectation-maximization segmentation. Such application can be automated, such as via the computer receiving an indication of a formation of the CBV map, such as via a message. Note that the automatic application can be made local to or remote from the computer, such as via a distributed computing platform. Such application can also be manual, such as based on a user request input into the computer, such as via an input device.

In block 220, a filter mask is generated based on the application of the filter to the resulting image via the computer. The filter mask is based on intensity values of the filter. The filter mask can be a binary mask, which can then be applied to the generated CBV image. The CBV image can be mapped according to changes in a transverse relaxation time ($\Delta R2$) induced by an injection of the gadolinium solution, where the CBV image can be derived by normalizing $\Delta R2$ to a mean $\Delta R2$ signal present in an internal jugular vein, as delineated by a blinded rater.

For example, to process the CBV image, such as to determine contrast uptake and scan, the pre-contrast image and the post-contrast image are high resolution MRI images which focus on what is referred to as T1 weighting, or a spin-lattice relaxation time. This time varies from tissue to tissue, where population of protons generates resonant frequencies depending on a tissue molecular composition. For example, white matter has a different spin-lattice relaxation time compared to cerebrospinal fluid. For a standard MRI sequence, T1 properties, specific time to echo (TE), and time to repetition (TR) are adjusted to optimize an acquisition of such scans as well as an amount of time a scan should take. In one example, a spoiled T1 weighted gradient echo image was acquired with a sub-millimeter resolution in-plane of an oblique hippocampus (0.68*0.68*3 mm). Such scan was obtained prior to and after an intravenous bolus injection of a tracer agent. One type of tracer agent is a chelated form of gadolinium at a prescribed dosage. Some effects of such tracer agent have been studied, and this tracer agent is known for an ability not to cross a blood brain barrier of the patient, while increasing contrast of a brain vasculature. A gadolinium ion in the tracer agent acts as a paramagnet in a main coil of an MRI magnet. As such, when exposed to an external magnetic field, the gadolinium ion impacts a local relaxation rate of protons in proximity of the gadolinium ion. An effect this susceptibility has on influencing protons (and therefore on an MRI signal) of surrounding tissues is orders of magnitude higher than a paramagnetic or ferromagnetic effect from endogenous contrast sources in the brain, such as deoxygenated hemoglobin or components of tissue, such as hemosiderin or hemoglobin. Accordingly, using previously defined timing constraints, a set of identical imaging sequences is acquired, such as two. Each of the sequences has a T1 weighting before and after an intravenous injection of the contrast agent. After conclusion of the intravenous injection of the contrast agent, a time period of four (4) minutes is set prior to a start of a second part of the acquisition. This time gap allows for an adequate perfusion through a circulatory system of the patient. Note that there can be a preservation of the blood brain barrier, where the blood brain barrier acts as a filter that only certain molecules and metabolites can pass through to tissues in a capillary bed, whereas others recirculate through the brain. In cases of tumor growth or hemorrhages, there may be a breakdown of the blood brain barrier, in which case one method described herein may not as adequately detect a microvasculature of the brain.

One way to measure whether MRI signal has been adequately increased throughout the brain is to examine histograms of both pre-contrast image and the post-contrast image. As shown in FIGS. 3A and 3B, by subtracting a pre-contrast image one dimensional histogram (with fixed binning) from a post-contrast image one dimensional histogram, a histogram of subtracted values is obtained. Such histogram can be evaluated to see if there is accurate 'uptake' of the contrast agent.

In FIG. 3A, where an X-axis corresponds to a voxel intensity and a Y-axis corresponds to a count of signal intensities, a sample plot diagram is depicted, where the sample plot diagram is generated for the pre-contrast image (indicated by 'x') and the post contrast image (indicated by '*'). Such plot diagram representatively graphs a difference of the pre-subtracted image histogram from the post-subtracted image histogram. In FIG. 3B, where an X-axis corresponds to signal intensities and a Y-axis corresponds to histogram counts, the sample plot diagram of FIG. 3A is fit to a distribution, such as a second degree Gaussian distribution. Doing so yields a positive mean for a higher intensity distribution (indicated a net increase in signal in the post-contrast image) and a negative mean for a lower mean distribution. This mean is used to compare to an existing distribution to determine if, for instance, there is lack of significant contrast uptake, or other contrast enhancing related abnormalities that would alter either curves significantly.

Further, to generate the CBV image, such as to identify a blood vessel, a location in the brain is identified, where the location identifies a vessel having a flow of 'pure blood' in the brain. This location is used as a denominator in later calculations. 'Pure blood' is defined as a mean value of signal from an area known to be pure blood, i.e. the superior sagittal sinus. The location of this mask is used as a sample of points, most or all of which have a value. The computer then calculates the mean values of all of the subtracted values inside this vessel and determines a total mean value. This mean value is a number that is then used for the denominator. This vessel is identified by analyzing the post-contrast image, which is a conventional 'structural with contrast' MRI image with clear enhanced vasculature, in a 3D matrix form. This image is loaded into the 3D matrix form, and a Hessian matrix form of the 3D matrix of numbers is calculated. The Hessian matrix is a square matrix of second order derivatives. The parameters that define such eigenvalues determine a local curvature of large value difference inside the post-contrast image. Depending on these eigenvalue voxel values, a map is made with a set of particular pre-defined eigenvalue ratios. This map is called a 'vesselness' function. Once these ratios are thresholded to a specific number and parameter, the computer can obtain local voxel probabilities for plate, tubular, or spherical structures. Values are chosen that correspond to small (i.e. approximately <1 cm) diameter vessels, such as the superior sagittal sinus, which is seated within a cannula above a falx cerebri of the brain. A grayscale implementation of such output is saved as a grayscale image and the grayscale image is binarized so that only areas where prospective vessels are positioned is masked. Several morphological operations, such as erosion or dilation, are performed on the grayscale image and a connected component algorithm is performed to assign each masked region that consists of contiguous vessels its own unique set of numbers in the post-contrast image.

FIGS. 4A and 4B show an example of this connected component system. FIG. 4A shows an example embodiment of an image with several connected components which are unlabeled according to the present disclosure. In FIG. 4A, potential vessels are shown, with each of the shown structures containing an identical fixed value. FIG. 4B shows an example embodiment of an image with several connected components which are labeled based on contiguous voxels according to the present disclosure. In FIG. 4B, the potential vessels are shown after a connected component system has been applied. Therefore, each contiguous structure contains uniform values, but those values change from one structure to another.

Figure 8:
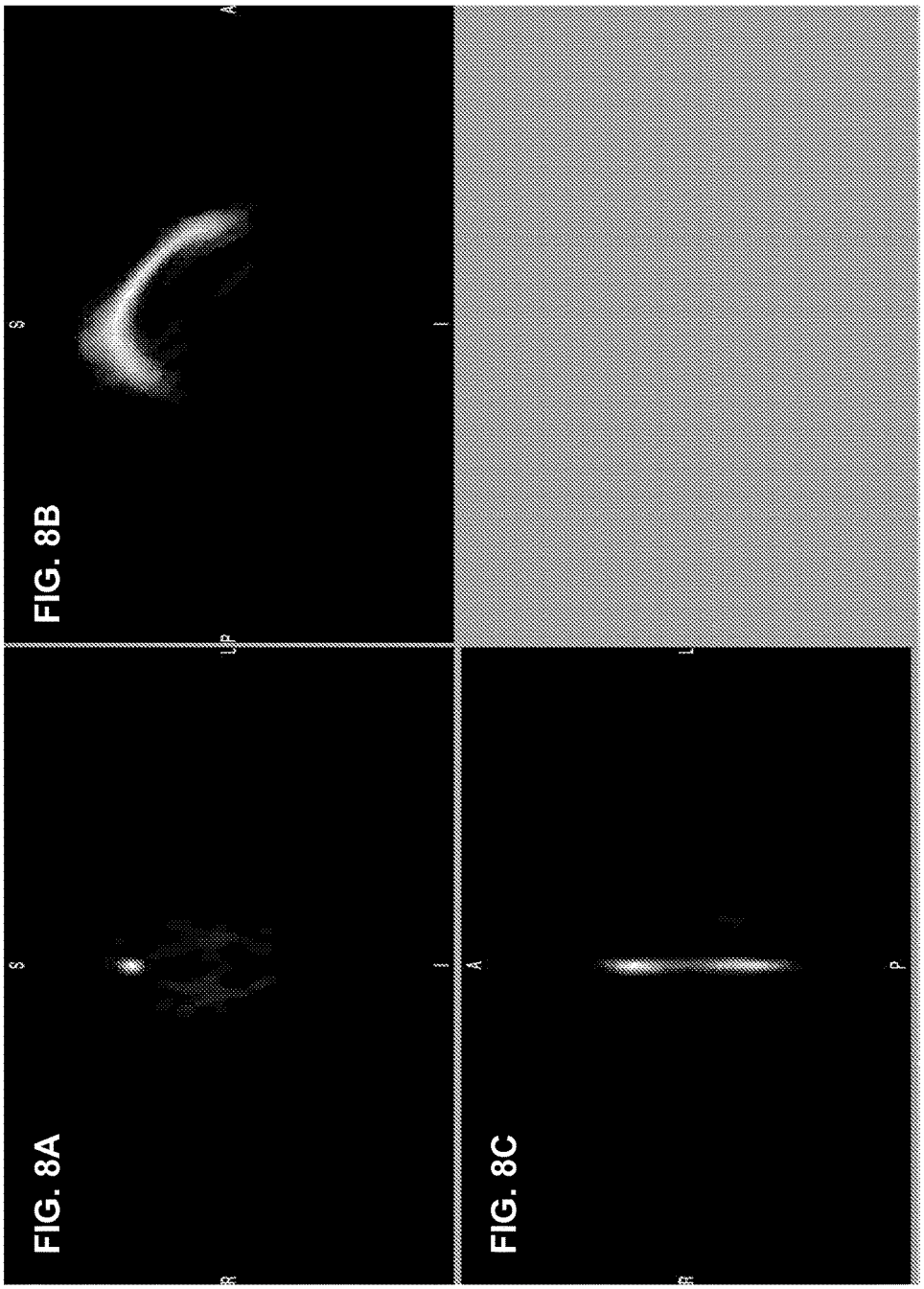
FIG. 8A shows an example embodiment of a frontal view of a probabilistic atlas in a standard space according to the present disclosure.
FIG. 8B shows an example embodiment of a sagittal side view of a probabilistic atlas in a standard space according to the present disclosure.
FIG. 8C shows an example embodiment of a top view of a probabilistic atlas in a standard space according to the present disclosure.

Accordingly, a probabilistic atlas corresponds to a set of existing manually corrected sagittal sinus masks. The probabilistic atlas is positioned in a standard space, such as the space of an existing canonical atlas. The probabilistic atlas is used as a reference. A mean value of each of the connected component masks is multiplied by the probabilistic atlas, voxel by voxel, and a mean value is generated for each voxel value. A largest mean value for a connected component mask corresponds to an area most likely to include the superior sagittal sinus in a new image (since all images are in co-registered space). This mask is applied to the subtracted image (generated from a co-registered pre-contrast image subtracted from a post-contrast image) and a set of top remaining voxels, such as, for example, 25% based on brightness, are considered to constitute the vessel mask, and from these voxels a mean value is generated. Other percentages may be used, such as, for example, less than 10%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, greater that 40% may be used. Therefore, as shown in FIGS. 5A-5D, a frontal, a side, a top, and an orthographic views are depicted respectively. Each of the views illustrates a raw unbinarized vesselness mask from various perspectives. Likewise, as shown in FIGS. 6A-6D, a frontal, a side, a top, and an orthographic views are depicted respectively. Each of the views in FIGS. 6A-6D illustrates a connected component mask of FIGS. 5A-5D from various perspectives, after thresholding, i.e., FIGS. 5A-6D depict an archetypical image. Similarly, FIG. 7 depicts a ranking of likelihood of an isolated mask compared to a probabilistic atlas. Moreover, as shown in FIGS. 8A-8C, a frontal, a side, and a top views are depicted respectively. Each of the views in FIGS. 8A-8C illustrates a probabilistic atlas in a standard space, from a different perspective.

Figure 9:
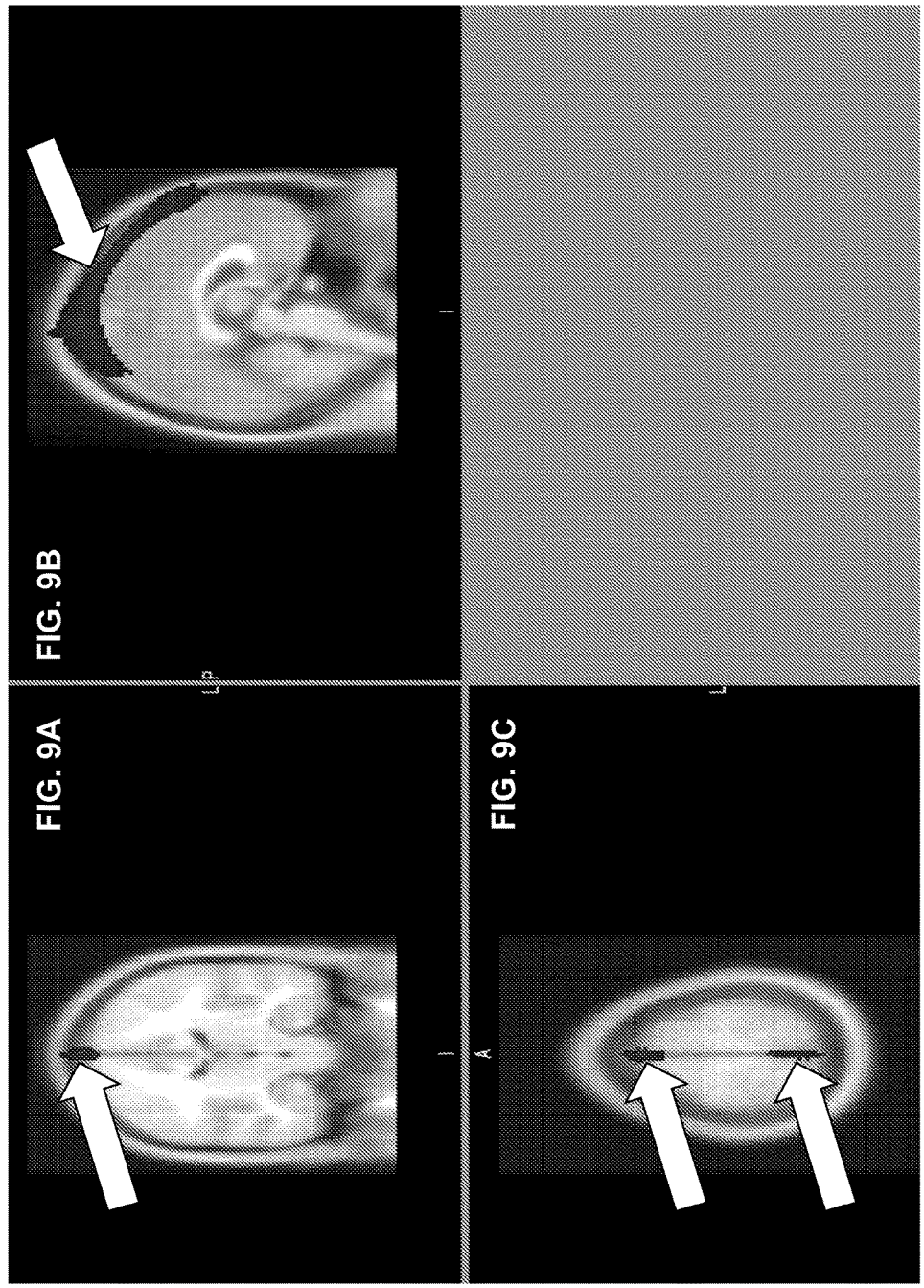
FIG. 9A shows an example embodiment of a frontal view of a vessel atlas image on a template brain according to the present disclosure.
FIG. 9B shows an example embodiment of a sagittal side view of a vessel atlas image on a template brain according to the present disclosure.
FIG. 9C shows an example embodiment of a top view of a vessel atlas image on a template brain according to the present disclosure.

The superior sagittal sinus is used to capture a bulk of cerebrovasculature located within one specific area of cerebrum. In order to obtain a measurement of 'pure blood' in the subtracted image, a series of segmented and manually curated superior sagittal sinus masks are calculated. All relevant images are in a group template space such that the superior sagittal sinus is in one stereotactic space. The group template space is generated using the pre-contrast images, which is similar to structural T1 images and provide adequate regional information desired to both not only to generate an accurate anatomical average template of the sample brains, but also to perform an accurate co-registration calculation. Although a type of co-registration can vary, a diffeomorphic, which can be similar to that found in an Advanced Normalization Toolkit (ANTS) software package, can be used. This group template is a "space" to which a connected component thresholded image can be co-registered. FIGS. 9A-9C depict an example of an vessel atlas image on a template brain from a frontal view, a side view, and a top view respectively.

Figure 10:
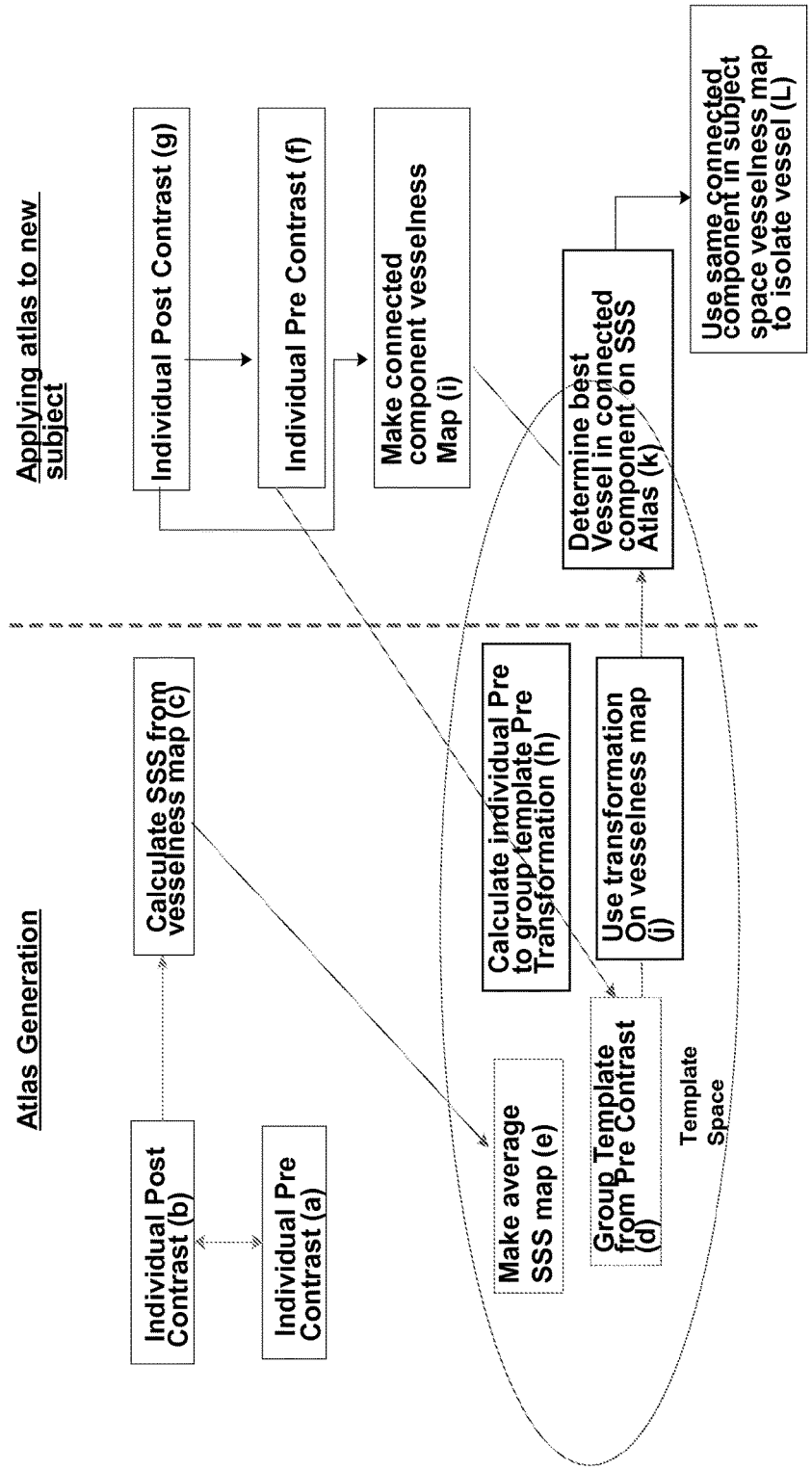
FIG. 10 shows an example embodiment of an atlas generation and atlas application diagram according to the present disclosure.

FIG. 10 shows an example embodiment of an atlas generation and atlas application diagram according to the present disclosure. To generate an atlas, a group of pre-contrast and post-contrast images are generated from a population of subjects that match certain criteria for a standard population. This standard population can include subjects sharing similar ethnicity, age, and gender. For each individual from that group, an individual pre-contrast image (a) is subtracted from an individual post-contrast image (b) to obtain a subtracted image, as described herein. A superior sagittal sinus depiction is calculated from a vesselness map (c) based on the subtracted image, as described herein. A template is grouped from a set of pre-contrast images (d) and an average superior sagittal nerve map is formed (e) based on calculating the superior sagittal sinus depiction (c), as described herein, such as probabilistically. Note that a template space is based on an average brain collection of data of the group. To apply an atlas to a new subject, an individual pre-contrast image is applied onto the template (f), as described herein, which can be via block (h). Assuming an individual pre and post contrast image are in the same space, then the pre-contrast image is co-registered to the group template space, and the transformation (a matrix file containing transformation information) is applied to the individual post-contrast image, thus placing in the space of the template (g) and (h), as described herein. A connected component vesselness map is formed (i) based on the individual post-contrast image (g). The group template (d) is processed via transformation on vesselness map (j) on the template space. An output of such transformation (j) and an output of connected component vesselness map (i) is used to determine best or optimal vessel in connected component on a superior sagittal sinus nerve atlas (k) based on block (e). Note that what is best or optimal is determined based on looking for overlaps, where the best or optimal vessel is multiplied by the superior sagittal sinus atlas with each connected component mask being represented as (1,0). The same connected component is used in subject space vesselness map to isolate a vessel (L).

For optimization parameters, note that several parameters can be used that can be tailored to a specific goal or an imaging requirement. First, images are acquired with a predefined sequence parameter, a fairly routine T1 weighted structural MRI scan. The sequence is developed with considerations for best capturing an anatomy of a long circuit of the hippocampus. Some fundamental factors of the MRI sequence, such as time to repetition (TR) and time to echo (TE), are meant to reduce a time to acquire the scan. Such parameters could be applied to different scanner types, however, CBV images can be made functionally from any T1 weighted scan within appropriate parameters. If a new scanner is used to acquire CBV images, then a phantom could be used and a set of values can be compared to in order to ensure reliability across sites. Phantom refers to a custom device that contains a known number of permanent items known to show up in an MRI scan that can be scanned repeatedly without change in signal. To accomplish such configuration, a phantom can be used on each machine to compare signal intensities and geometries. For purposes of developing this sequence, an adapted Spoiled Gradient Echo (SPE) can be used. SPE uses a standard gradient echo sequence with a component that 'spoils' or uses either radiofrequency (RF) pulses or gradients to greatly reduce unwanted effects of transverse magnetization.

Figures 11A, 11B, 11C:
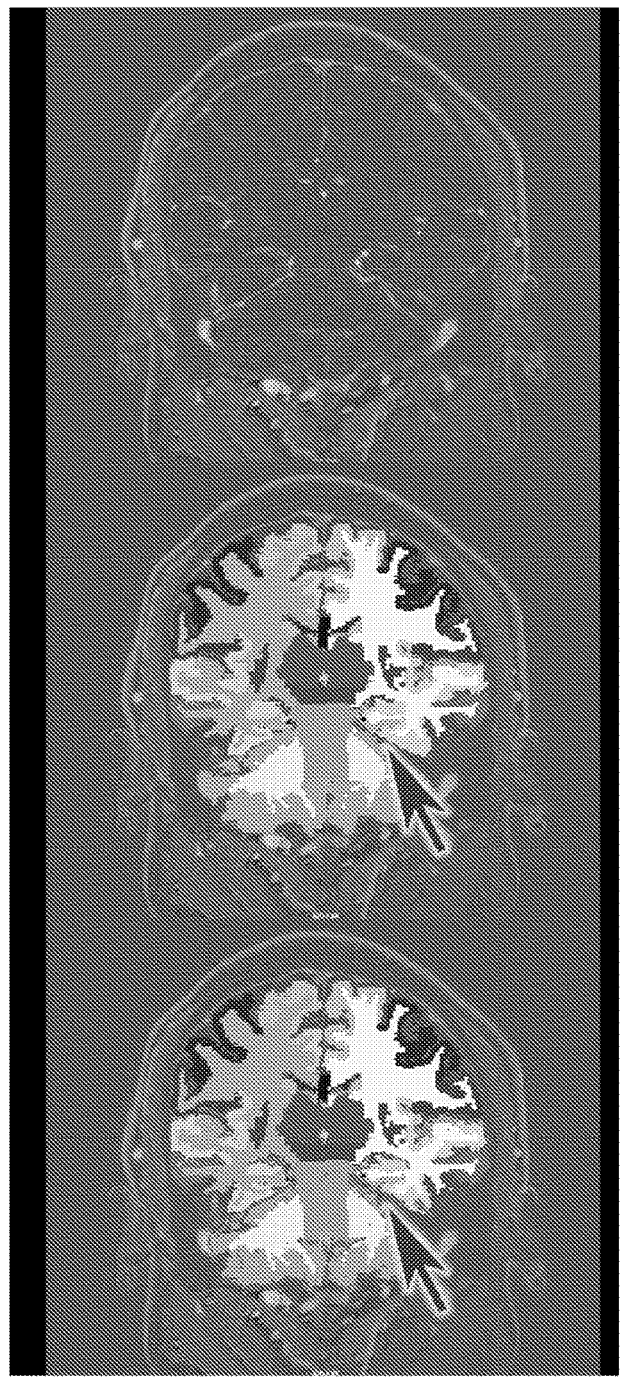
FIG. 11A shows an example embodiment of a CBV map on an anatomical space according to the present disclosure.
FIG. 11B shows an example embodiment of a CBV map labeled based on regions according to anatomical locations on an anatomical space according to the present disclosure.
FIG. 11C shows an example embodiment of a CBV map with vessel filters on an anatomical space according to the present disclosure.

In order to identify a vessel cutoff, i.e. filtering, since at least some of valuable information of the CBV map comes from identification changes present in small vasculature of the cerebrum, and not necessarily large or epicortical vessels, there may sometimes be a need to filter those larger vessels. Since these vessels occur throughout the brain and not just encapsulating a periphery thereof, at least some values of high signal would need to be identified so that the high signal does not significantly influence the smaller region of interest analysis. The smaller (»1 mm) vasculature makes up a bulk of the cerebrum, but for other purposes where the contrast agent is used in a clinical setting, identification of most or substantially all vessels. Large vessels are easily identifiable as the cutoff is determined by fitting a 2nd degree Gaussian curve to the signal of the non-zero CBV map voxels. Although, a cutoff of ten (10) percent or some other amount such as, for example, any percentage from 5% to 25% or greater can be applied, however, a fitted Gaussian curve can more accurately determine a gross high intensity signal cutoff and exclude such cutoff from analysis. FIG. 11A shows a raw CBV image mapped on an anatomical space. FIG. 11B shows a cortical segmentation mask, which is labeled based on regions according to anatomical locations on the anatomical space. FIG. 11C shows the cutoff applied to the cortical segmentation mask, where the CBV map is illustrated with vessel filters on the anatomical space. A red arrow indicates an area of increased signal that is filtered (i.e. no longer shows up in the masked image) after the cutoff is applied. Note that this corresponds to the block 220 of FIG. 2.

For CBV image generation, once the vessel mask on the post contrast image has been identified, a first step to generate the CBV map is to create a median mask of the post-contrast image and the pre-contrast image. This places both images in one stereotactic space, and accounts for head movement between first and second acquisition. Next, a subtracted image is generated. This subtracted image is then divided by the value of pure blood, as previously defined as a mean value of signal from an area known to be pure blood, i.e. the superior sagittal sinus. A resulting map then has the aforementioned filtering method applied to remove large, high signal vessels.

Figure 12:
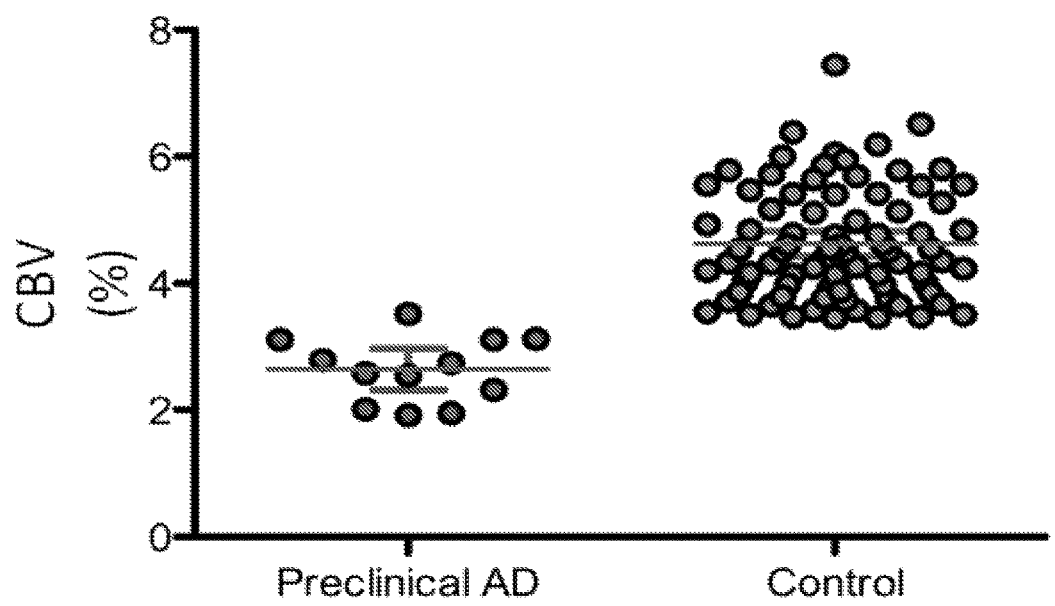
FIG. 12 shows a diagram of an example embodiment of a table of statistics according to the present disclosure.

For sample size and findings based on patient samples, see FIG. 12, which applies to a parametrically derived template using a voxel based analysis. In FIG. 12, values for each subject group came from a bilateral region of interest in a lateral entorhinal cortex in a hippocampal formation. This region and a corresponding space of this region can be applied to a new CBV scan and determine mean value in that region. Note that several statistical methods were performed to determine results using CBV data. These include 2×2 factorial analyses, one-way analysis of variance (ANOVA) and group comparisons. These data may be may performed on either voxel (a smallest reconstructed unit of an MRI image) or a region based analysis. In determining regional differences in the CBV data, a raw CBV signal with parametric analyses and mean CBV signal with regional analysis and mean CBV values in pre-defined regions (confined to pre-defined spaces) was examined.

Figure 13:
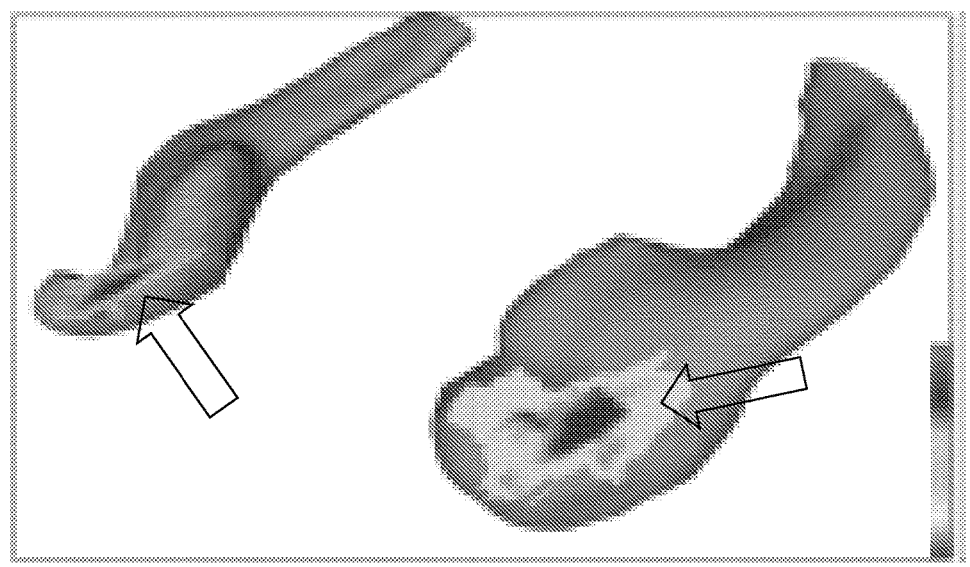
FIG. 13 shows a perspective view of an example embodiment of a CBV ROI discriminating between controls and preclinical Alzheimer' patients according to the present disclosure.

FIG. 13 shows a perspective view of an example embodiment of a CBV ROI discriminating between controls and preclinical Alzheimer' patients according to the present disclosure. FIG. 13 supports a determination of a utility of a different CBV ROI in being able to discriminate between controls and preclinical Alzheimer's disease. Although a region indicated is the entorhinal cortex, which is an area implicated in a pathophysiology of a disease, an identical approach would apply in patients with psychosis who may convert to schizophrenia. Instead of this region, a focus would be near the CA1/subiculum sub-regions of the hippocampus, as increased metabolism in this region as detected with CBV is correlated to conversion to psychosis.

In one aspect, in terms of patient population or monitoring, a focus on a neurological or psychiatric disorder entails using study data to establish interval plots, such as for aging patients, or pre-defined ranges for prescribed groups. Another potential approach entails determination of a "cutoff", a value above which or below which CBV would be considered to be "positive".

In some embodiments, a computer can run software which can display an example set of imaging scans which depict a calculation of hippocampal volume which correlates to Alzheimer's disease risk according to the present disclosure. Accordingly a set of graphs can be generated, where the set of graphs can indicate a left and a right hippocampus volumes in contrast to left and right inferior lateral ventricle.

Figure 14:
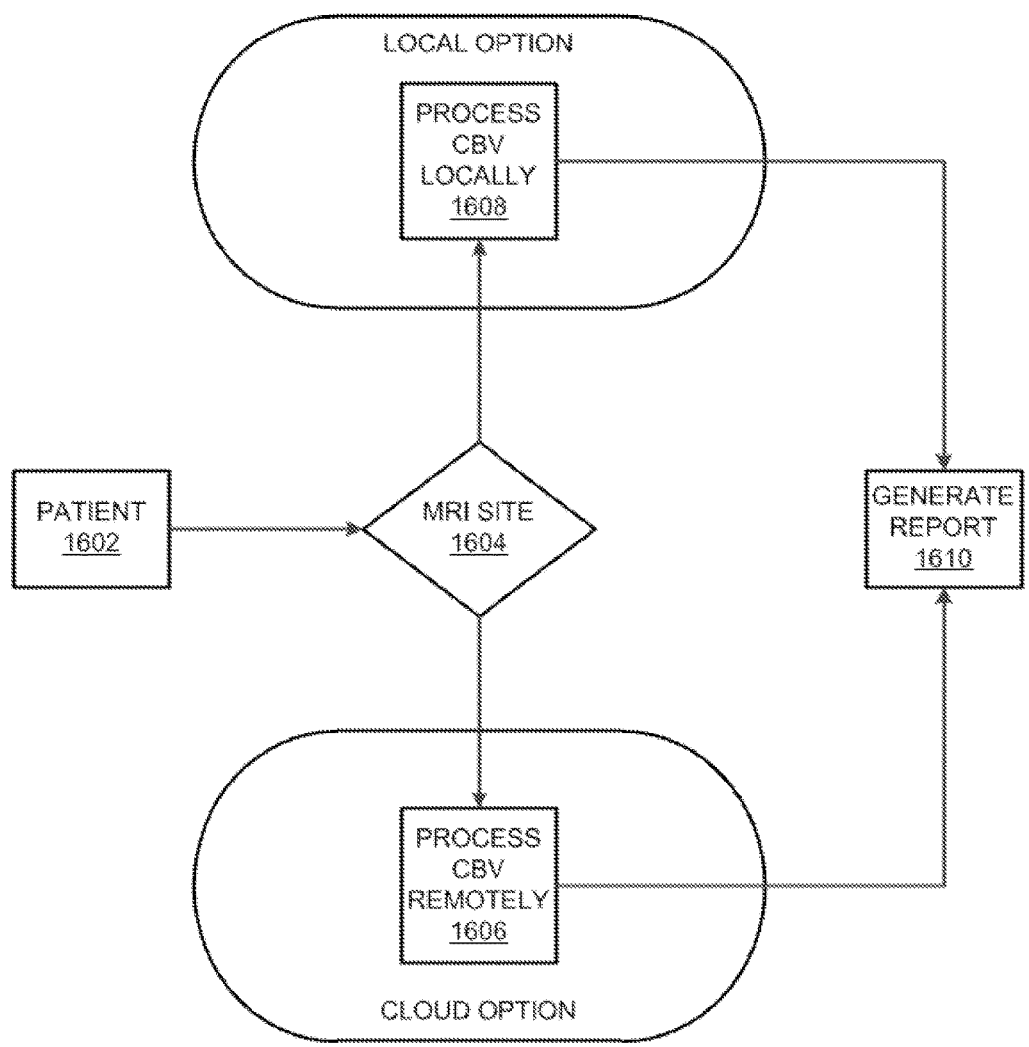
FIG. 14 shows a flowchart of an example embodiment of a process for image processing according to the present disclosure.

FIG. 14 shows a flowchart of an example embodiment of a process for image processing according to the present disclosure. A computer system configured according to a technology described herein, but at least with different correlation parameters, a decrease in time for a preclinical diagnosis of schizophrenia can be accomplished. In that regard, in process 1600, a patient 1602 can arrive at an MRI site 1604, where after an MRI is generated, such data can be processed using an algorithm described herein. In some embodiments, process 1600 can take approximately 10 hours to produce a set of CBV values that then can be used to predict onset of psychosis, such as schizophrenia. For example, software can be installed on a standard personal computer for local processing, such as via a local option where the CBV is processed locally 1608. Alternatively, the software could be run on a larger computer such as a mainframe, such as in a hospital, with access via a terminal, such as a terminal in a hospital, such as via a local option where the CBV is processed locally 1608. Yet further, the software could be embedded in or incorporated into an MRI scanning system so that the analysis occurs at the MRI facility, such as via a local option where the CBV is processed locally 1608. Yet further, the software could be run on servers, such as encrypted servers using Amazon EC2, such as via a local option where the CBV is processed remotely 1606. One advantage of processing of such data via remote servers (cloud computing) enables the processing to occur on more powerful machines, while the result can be made available via less powerful devices such as so-called dumb terminals. Whether CBV is processed locally 1608 or remotely 1606, a report can be generated 1610 based on such processing. Such generation can be local or remote.

Figure 15:
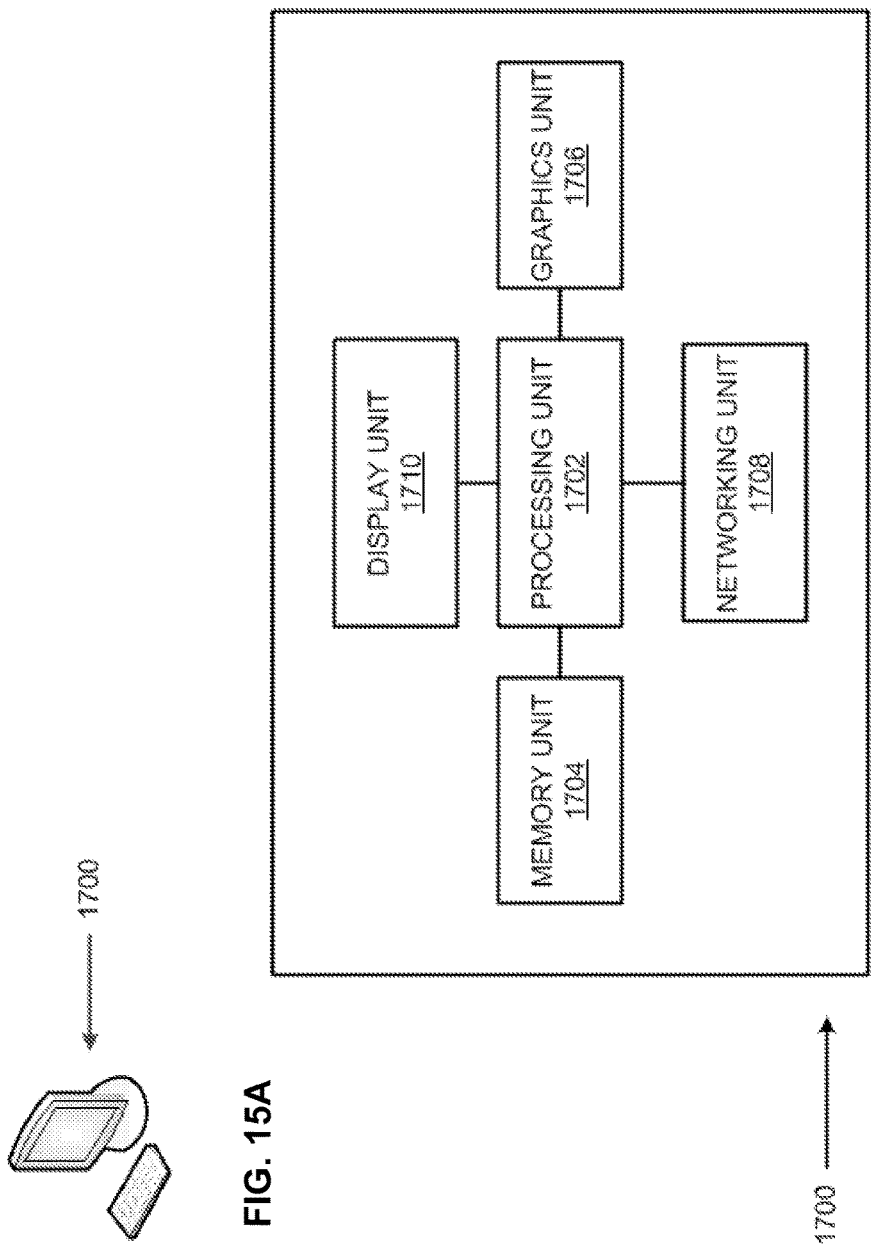
FIG. 15A shows a perspective view of an example embodiment of a desktop computer according to the present disclosure.
FIG. 15B shows a schematic view of an example embodiment of the desktop computer according to the present disclosure.

FIG. 15A shows a perspective view of an example embodiment of a desktop computer according to the present disclosure. A desktop computer 1700 is used for image processing, as described herein. However, note that other types of computers or computer systems can also be configured for image processing, as described herein. For example, such computer can be a workstation computer, a laptop computer, a terminal computer, a tablet computer, a mobile phone, a server computer, a medical imaging machine, a cloud-computing system, a mainframe, a supercomputer, or other suitable computers.

FIG. 15B shows a schematic view of an example embodiment of a computer according to the present disclosure. The computer 1700 comprises a processing unit 1702, a memory unit 1704 operably coupled to the processing unit 1702, a graphics unit 1706 operably coupled to the processing unit 1702, a networking unit 1708 operably coupled to the processing unit 1702, and a display unit 1710 operably coupled to the processing unit 1702. The computer 1700 is powered via mains electricity, such as via a power cable. In other embodiments, the computer 1700 is powered via at least one of an onboard rechargeable battery, such as a lithium-ion battery, and an onboard renewable energy source, such as a photovoltaic cell or a hydropower turbine. Note that the computer 1700 can be operably coupled to at least one user input device, such as a computer keyboard, a computer mouse, a touchpad, a touchscreen, or other suitable user input devices.

The processing unit 1702 comprises a hardware processor, such as a multicore processor. For example, the processing unit 1702 comprises a central processing unit (CPU).

The memory unit 1704 comprises a computer-readable storage medium, which can be non-transitory. The medium stores a plurality of computer-readable instructions for execution via the processing unit 1702. The instructions instruct the processing unit 1702 to facilitate performance of a method for diagnosis of a neurological or a psychiatric illness, as described herein. Some examples of the memory unit 1704 comprise a volatile memory unit, such as random access memory (RAM) unit, or a non-volatile memory unit, such as an electrically addressed memory unit or a mechanically addressed memory unit. For example, the electrically addressed memory comprises a flash memory unit. For example, the mechanically addressed memory unit comprises a hard disk drive. The memory unit 1704 is in wired communication with the processing unit 1702.

The graphics unit 1706 comprises a graphics processing unit (GPU) for image processing. The graphics unit 1706 is a graphics dedicated unit, but in other embodiments, the processing unit 1702 is integrated with the graphics unit 7106. For example, the graphics unit 1706 comprises a video card. The graphics unit 1706 is in wired communication with the processing unit 1702.

The networking unit 1708 comprises a network interface controller for computer network communication, whether wired or wireless. For example, the networking unit 1708 comprises a hardware unit for computer networking communication based on at least one standard selected from a set of Institute of Electrical and Electronics Engineers (IEEE) 802 standards, such as an IEEE 802.11 standard. For instance, the networking unit 1708 comprises a wireless network card operative according to a IEEE 802.11(g) standard. The networking unit 1708 is in wired communication with the processing unit 1702.

The display unit 1710 comprises a display for displaying information. The display comprises at least one of an electronic visual display, a flat panel display, a liquid crystal display (LCD), an electrophoretic display, and a volumetric display. For example, the display unit 1710 comprises a touch-enabled computer monitor. The display unit 1710 is in wired communication with the processing unit 1702.

In one mode of operation, the computer 1700 runs such that a method for diagnosis of a neurological or a psychiatric illness, as described herein, is performed, such as based on receiving a user request input via the display unit 1710. The computer 1700 displays a result of the method via the display unit 1710 based on operation of the graphics unit 1706. Optionally, the computer 1700 communicates the result to another computer over a computer network via the networking unit 1708, such as based on receiving a user request input via the display unit 1710.

In another mode of operation, the computer 1700 runs such that a method for diagnosis of a neurological or a psychiatric illness, as described herein, is performed, such as based on receiving a remotely input user request. The computer 1700 communicates the result to a user computer over a computer network via the networking unit 1708, such as based on receiving a remotely input user request. Such mode of operation can be based on a cloud computing model.

Figure 16:
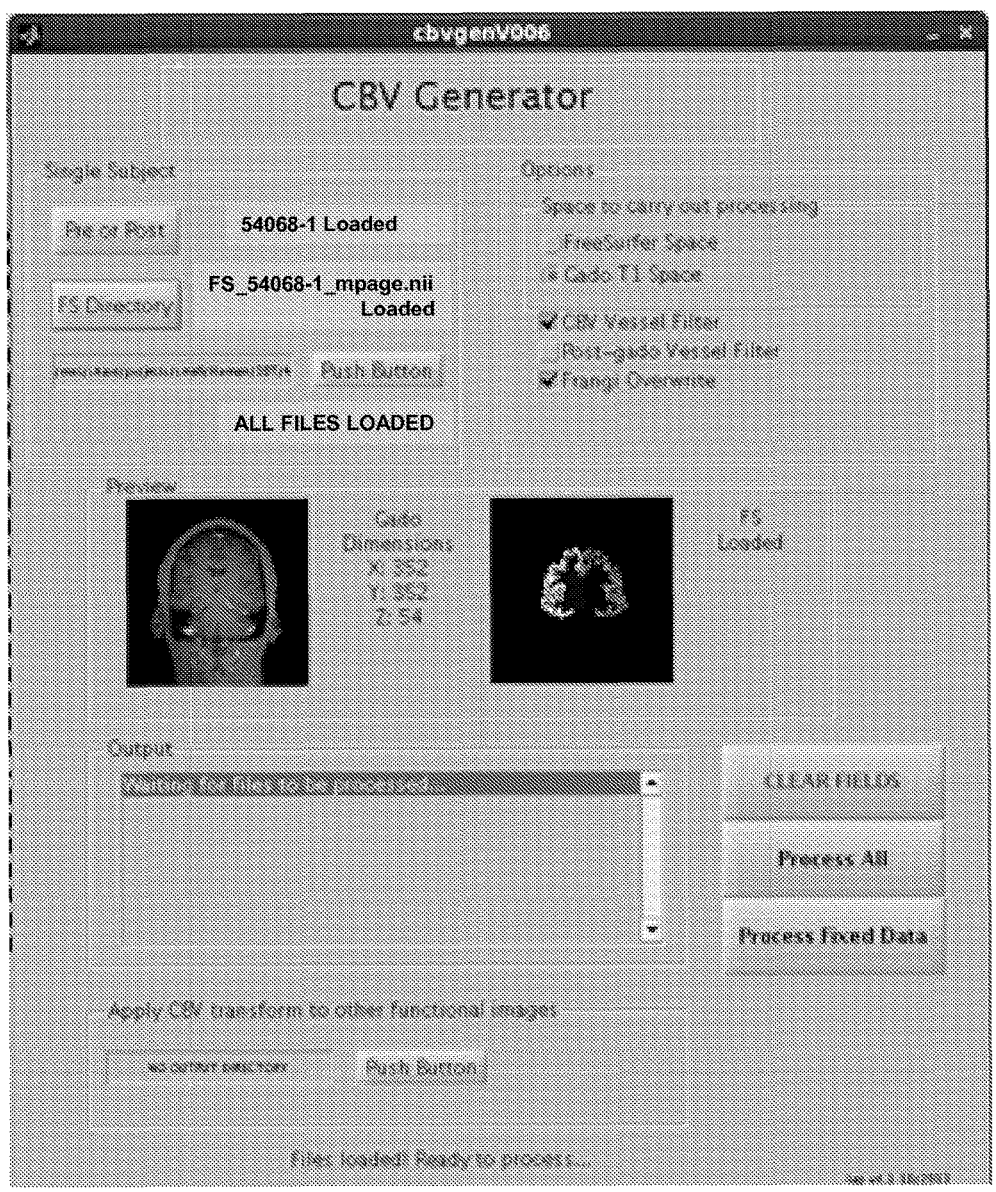
FIG. 16 shows an example screenshot of a software application for cerebral blood volume generation according to the present disclosure.

FIG. 16 shows an example screenshot of a software application for cerebral blood volume generation according to the present disclosure. The screenshot depicts a processing interface for generating CBV voxel values. As can be seen, in addition to a conventional brain imaging software package processing, such as FreeSurfer processing, there is a selection for use of a gadolunium paramagnetic contrast agent to produce other results in the T1 space.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

In some embodiments, an apparatus or system comprise at least one processor, and memory storing instructions that, when executed by the at least one processor, cause the apparatus or system to perform one or more methodological acts as described herein. In some embodiments, the memory stores data, such as one or more structures, metadata, lines, tags, blocks, strings, or other suitable data organizations.

As will be appreciated by one skilled in the art, aspects of this disclosure can be embodied as a system, method or computer program product. Accordingly, aspects of the present disclosure can take the form of an entirely hardware embodiment, an entirely software embodiment (including firmware, resident software, micro-code, etc.) or as embodiments combining software and hardware aspects that can all generally be referred to herein as a "circuit," "module" or "system." Furthermore, aspects of the disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific example (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present disclosure can be written in any combination of one or more programming language, including an object oriented programming language, such as Java, Smalltalk, C++ or the like and conventional procedural programming language, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the steps can be performed in a differing order or steps can be added, deleted or modified. All of these variations are considered a part of the disclosure. It will be understood that those skilled in the art, both now and in the future, can make various improvements and enhancements which fall within the scope of the claims which follow.

The invention claimed is:

1. A method comprising:
    identifying, via a computer, a vessel in a third image, wherein the third image is obtained from a subtraction of a second image from a first image, wherein the second image and the first image are aligned within an imaging space, wherein the first image is post-contrast, wherein the second image is pre-contrast;
    determining, via the computer, a voxel intensity mean value of a segment of the vessel in the third image based on a highest voxel intensity in the segment of the vessel such that the voxel intensity mean value indicates at least one of a content of a blood or a flow of the blood in the segment of the vessel;
    obtaining, via the computer, a fourth image from a division of the third image by the voxel intensity mean value such that a percentage of a volume of the blood shown in the segment of the fourth image is determinable;
    applying, via the computer, a filter onto the fourth image; and
    generating, via the computer, a filter mask based on the fourth image.

2. The method of claim 1, further comprising:
    performing, via the computer, a vessel segmentation process on at least one of the first image or the second image before the identifying.

3. The method of claim 2, wherein the performing is automatically triggered.

4. The method of claim 1, wherein the vessel comprises a diameter of about one centimeter or less.

5. The method of claim 1, wherein the identifying is based on a vesselness filter and a pre-defined region of interest, wherein the vesselness filter filters based on a set of eigenvalues of a Hessian matrix of the third image, wherein the third image is modified such that the region of interest is positioned in a predefined area.

6. The method of claim 1, wherein the voxel intensity mean value is based on a highest voxel intensity range in the segment, wherein the range comprises a top 40% of voxel intensities.

7. The method of claim 6, wherein the range comprises a top 33% of voxel intensities.

8. The method of claim 6, wherein the range comprises a top 25% of voxel intensities.

9. The method of claim 1, wherein the third image is a cerebral blood volume map, wherein the filter is based on at least one of a performance of an expectation-maximization segmentation, or a fitting of a bimodal Gaussian curve to a histogram of data in accordance with the third image.

10. The method of claim 1, wherein the filter mask is a binary mask, and further comprising:
applying, via the computer, the binary mask to the third image; and
mapping, via the computer, based on the applying, the third image according to a change in a transverse relaxation time induced via an input of a contrast agent.

11. A system comprising:
a hardware processor;
a memory coupled to the hardware processor, wherein the memory stores a set of instructions to execute via the hardware processor, wherein the instructions instruct the hardware processor to perform a method comprising:
identifying, via a computer, a vessel in a third image, wherein the third image is obtained from a subtraction of a second image from a first image, wherein the second image and the first image are aligned within an imaging space, wherein the first image is post-contrast, wherein the second image is pre-contrast;
determining, via the computer, a voxel intensity mean value of a segment of the vessel in the third image based on a highest voxel intensity in the segment of the vessel such that the voxel intensity mean value indicates at least one of a content of a blood or a flow of the blood in the segment of the vessel;
obtaining, via the computer, a fourth image from a division of the third image by the voxel intensity mean value such that a percentage of a volume of the blood shown in the segment of the fourth image is determinable;
applying, via the computer, a filter onto the fourth image; and
generating, via the computer, a filter mask based on the fourth image.

12. The system of claim 11, wherein the method further comprises:
performing, via the computer, a vessel segmentation process on at least one of the first image or the second image before the identifying.

13. The system of claim 12, wherein the performing is automatically triggered.

14. The system of claim 11, wherein the vessel comprises a diameter of about one centimeter or less.

15. The system of claim 11, wherein the identifying is based on a vesselness filter and a pre-defined region of interest, wherein the vesselness filter filters based on a set of eigenvalues of a Hessian matrix of the third image, wherein the third image is modified such that the region of interest is positioned in a predefined area.

16. The system of claim 11, wherein the voxel intensity mean value is based on a highest voxel intensity range in the segment, wherein the range comprises a top 40% of voxel intensities.

17. The system of claim 16, wherein the range comprises a top 33% of voxel intensities.

18. The system of claim 16, wherein the range comprises a top 25% of voxel intensities.

19. The system of claim 11, wherein the third image is a cerebral blood volume map, wherein the filter is based on at least one of a performance of an expectation-maximization segmentation, or a fitting of a bimodal Gaussian curve to a histogram of data in accordance with the third image.

20. The system of claim 11, wherein the filter mask is a binary mask, and wherein the method further comprises:
applying, via the computer, the binary mask to the third image; and
mapping, via the computer, based on the applying, the third image according to a change in a transverse relaxation time induced via an input of a contrast agent.

21. A non-transitory computer-readable storage device storing a set of instructions for execution via a processing circuit to implement a method, wherein the method comprises:
identifying, via a computer, a vessel in a third image, wherein the third image is obtained from a subtraction of a second image from a first image, wherein the second image and the first image are aligned within an imaging space, wherein the first image is post-contrast, wherein the second image is pre-contrast;
determining, via the computer, a voxel intensity mean value of a segment of the vessel in the third image based on a highest voxel intensity in the segment of the vessel such that the voxel intensity mean value indicates at least one of a content of a blood or a flow of the blood in the segment of the vessel;
obtaining, via the computer, a fourth image from a division of the third image by the voxel intensity mean value such that a percentage of a volume of the blood shown in the segment of the fourth image is determinable;
applying, via the computer, a filter onto the fourth image; and
generating, via the computer, a filter mask based on the fourth image.

22. The computer-readable storage device of claim 21, wherein the method further comprises:
performing, via the computer, a vessel segmentation process on at least one of the first image or the second image before the identifying.

23. The computer-readable storage device of claim 22, wherein the performing is automatically triggered.

24. The computer-readable storage device of claim 21, wherein the vessel comprises a diameter of about one centimeter or less.

25. The computer-readable storage device of claim 21, wherein the identifying is based on a vesselness filter and a pre-defined region of interest, wherein the vesselness filter filters based on a set of eigenvalues of a Hessian matrix of the third image, wherein the third image is modified such that the region of interest is positioned in a predefined area.

26. The computer-readable storage device of claim 21, wherein the voxel intensity mean value is based on a highest voxel intensity range in the segment, wherein the range comprises a top 40% of voxel intensities.

27. The computer-readable storage device of claim 26, wherein the range comprises a top 33% of voxel intensities.

28. The computer-readable storage device of claim 26, wherein the range comprises a top 25% of voxel intensities.

29. The computer-readable storage device of claim 21, wherein the third image is a cerebral blood volume map, wherein the filter is based on at least one of a performance of an expectation-maximization segmentation, or a fitting of a bimodal Gaussian curve to a histogram of data in accordance with the third image.

30. The computer-readable storage device of claim 21, wherein the filter mask is a binary mask, and wherein the method further comprises:
applying, via the computer, the binary mask to the third image; and mapping, via the computer, based on the applying, the third image according to a change in a transverse relaxation time induced via an input of a contrast agent.

\* \* \* \* \*